mber: US 9,204,319 B2

United States Patent
Ouyang et al.

(10) Patent No.: US 9,204,319 B2
(45) Date of Patent: Dec. 1, 2015

(54) ESTIMATING LONG TERM EVOLUTION NETWORK CAPACITY AND PERFORMANCE

(71) Applicant: CELLCO PARTNERSHIP, Basking Ridge, NJ (US)

(72) Inventors: Ye Ouyang, Basking Ridge, NJ (US); Carol Becht, Boonton, NJ (US); Gopinath Venkatasubramaniam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 81 days.

(21) Appl. No.: 14/248,056

(22) Filed: Apr. 8, 2014

(65) Prior Publication Data

US 2015/0289149 A1     Oct. 8, 2015

(51) Int. Cl.
*H04L 1/00*     (2006.01)
*H04W 24/02*     (2009.01)

(52) U.S. Cl.
CPC .................................... *H04W 24/02* (2013.01)

(58) Field of Classification Search
None
See application file for complete search history.

(56) References Cited

U.S. PATENT DOCUMENTS

| | | | | |
|---|---|---|---|---|
| 2014/0073303 A1* | 3/2014 | Henderson | ............ | H04W 24/02 455/418 |
| 2014/0111517 A1* | 4/2014 | Vela | ........................ | H04W 4/24 345/440 |
| 2014/0220998 A1* | 8/2014 | Kovacs | ............... | H04L 41/5009 455/453 |

OTHER PUBLICATIONS

Recommendation ITU-T E.800, Series E: Overall Network Operation, Telephone Service, Service Operation and Human Factors; Definitions of Terms Related to Quality of Service (2008).
3GPP TS 36.331 v8.0.0, 3rd Generation Partnership Project, Technical Specification (Release 8) (2007).
Ikuno et al., "System Level Simulation of LTE Networks," IEEE 71st Vehicular Technology Conference: VTC2010-Spring, pp. 16-19 (2010).
Grillo et al., "Implementation Options and Economics of Phased UMTS Deployment," Journal of Communications and Networks, 4(4)282-291 (2002).
Ricciato et al., "Traffic Analysis at Short Time-Scales: An Empirical Case Study From a 3G Cellular Network," IEEE Transactions on Network and Service Management, 5(1):11-21 (2008).
Wang et al., "Network Traffic Prediction Based on Seasonal ARIMA Model," Proceeding of the 5th World Congress on Intelligent Control, (2004).

(Continued)

*Primary Examiner* — Kouroush Mohebbi

(57) ABSTRACT

Systems and methods for estimating network capacity or performance are disclosed. In some implementations, a target network resource is selected for evaluation. Key performance indicators for computing a target network resource value for the target network resource are determined. The determined key performance indicators are filtered out of a set of key performance indicators. A data set is gathered. The data set comprises multiple points. Each point indicates a key performance indicator value for at least one of the determined key performance indicators and the target network resource value. A calculation module is trained to calculate the selected target network resource value based on key performance indicator values included in the gathered data set. The calculation module is tested using a testing data set. The testing data set has a same probability distribution of key performance indicator values and target network resource values as the gathered data set.

20 Claims, 11 Drawing Sheets

(56) References Cited

OTHER PUBLICATIONS

Tsao et al, "Design and Evaluation of UMTS-WLAN Interworking Strategies," Computer & Communications Research Labs. (2002).

Szlovencsak et al., "Planning Reliable UMTS Terrestrial Access Networks," IEEE Communication Networks (2002).

Khan et al., "QoE Prediction Model and its Application in Video Quality Adaptation Over UMTS Networks," IEEE Transactions on Multimedia, 14(2):431-442 (2011).

Navaie et al., "A Framework for UMTS Air Interface Analysis," Can. J. Elect. Computer Eng., 28(3/4)113-129 (2003).

Engels et al., "Autonomous Self-Optimization of Coverage and Capacity in LTE Cellular Networks," IEEE Transactions on Vehicular Technology, 62(5):1989-2004 (2013).

Amzallag et al., "Cell Selection in 4G Cellular Networks," IEEE Transactions on Mobile Computing, 12(7):1443-1455 (2013).

Ricciato et al., "Traffic Monitoring and Analysis for the Optimization of a 3G Network," IEEE Wireless Communications, pp. 42-49 (2006).

Ye Ouyang et al., "A Performance Analysis of UMTS PS Network Based on Multivariate KPIs", IEEE Wireless Telecommunications Symposium 2010. Tampa, FL, USA. Apr. 21-23, 2010.

\* cited by examiner

ESTIMATING LONG TERM EVOLUTION NETWORK CAPACITY AND PERFORMANCE

CROSS-REFERENCE TO RELATED APPLICATION

This application is related to U.S. patent application Ser. No. 14/247,798, entitled "ANALYZING AND FORECASTING NETWORK TRAFFIC," and being filed concurrently herewith, the entire content of which is incorporated herein by reference.

BACKGROUND

In recent years, mobile devices have been used to access cellular networks to complete more and more tasks. For example, in the past users accessed cellular networks primarily to make telephone calls or receive short messaging service (SMS) messages. However, data-based services, for example downloading and uploading email, videos, music, articles with images and text, etc., over a cellular network is becoming increasingly common. As a result, users are using an increasing amount of the cellular network resources. Cellular service providers have a limited amount of network resources that can be allocated for services and upgrade or shift usage of these resources in the event that demand for the resources overwhelms the existing resource capacity. Unfortunately, technical, governmental and business constraints prohibit the cellular service providers from constantly investing money to simply upgrade network resources. Instead, a balanced approach between usage shifting and upgrading may be desirable. To accomplish this, techniques for estimating network capacity or performance when different amounts of various resources are available are desirable, so that cellular service providers can determine in which cellular network resource(s) they should invest to upgrade.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
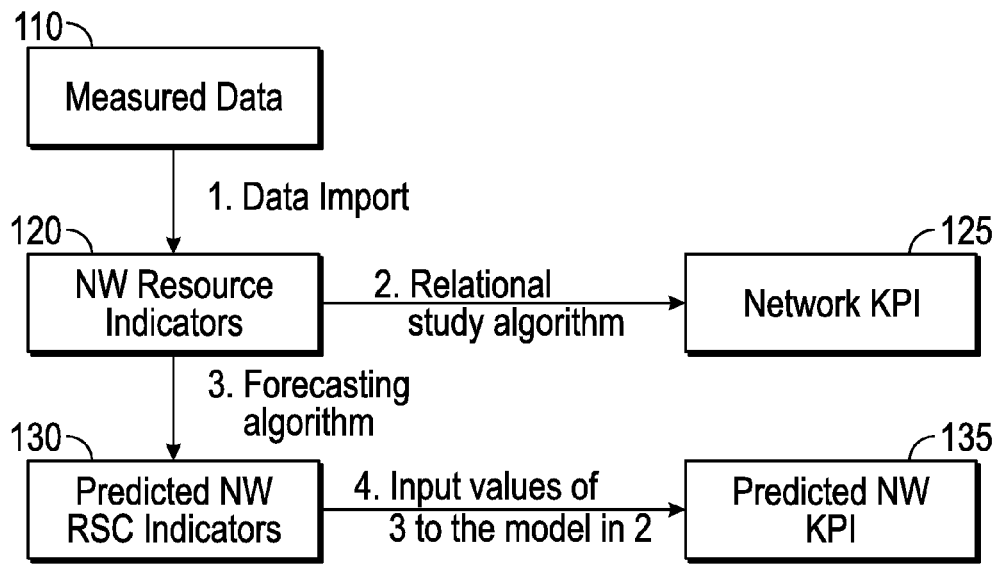
FIG. 1 illustrates an exemplary flow chart of an analytical model.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Traditionally, various simulation-based approaches are developed to study wireless network performance and capacity. However, simulation has its own limitations in supervised and unsupervised learning. Since big data has become increasingly available, it is possible to leverage big data algorithms to study high-speed cellular network performance, for example, 3G, 4G, or long term evolution (LTE) network performance. The subject technology, among other things, investigates high-speed cellular network performance using some aspect of data analytics and statistical modeling. Some implementations of the subject technology involve a methodology of data analytics and modeling to evaluate LTE network performance based upon traffic measurements and service growth trends. A relational algorithm has been developed first to obtain the relationship between LTE network resources and LTE key performance indicators (KPIs). Furthermore another forecasting algorithm has been developed to estimate network resource consumptions based upon traffic and service growth. The overall model has been validated and shows high accuracy, robustness, and reliability. The subject technology, in some cases, improves upon prior art simulation approaches and provides an opportunity to study wireless network performance from the new field-data analytics.

Exponential growth of mobile data services and smart devices have substantially increased a subscriber base of mobile operators and significantly increased the revenue of the mobile operators. However, wireless capacity is a finite resource which decreases as wireless traffic is increased or wireless service demand is increased. Currently, large amounts of data and signals sometimes overwhelm the wireless networks, a problem that is likely to only increase in the future. To prevent network resources from being unexpectedly consumed, mobile operators may leverage appropriate strategies of capacity management to meet ever-increasing network capacity requirements. Capacity management in wireless networks refers to a process of ensuring the wireless network is properly sized to meet traffic demand and to consume network resources in a most efficient way as much as possible. Wireless network capacity is represented by the extent to which various network resources are available to meet the overall voice, data, and signaling traffic. Capacity management considers existing and prospective requirements, the service provider's business objectives, network KPIs, service quality, and ultimately, the profitability of applications and services provided by the network.

FIG. 1 is a flow chart illustrating an outline of an analytical model described herein. As shown in FIG. 1, in step 110, measured data is imported. The measured data may include any measurable data related to a network.

In step 120, network resource indicators are determined using the measured data. Network resource indicators may be valued indicating amounts of available network resources. Exemplary network resources are described above. In step 125, network KPIs are derived from the network resource indicators using a relational study algorithm.

In step 130, a forecasting algorithm is developed to determine predicted network resource indicators. The relational study algorithm is used on the predicted network resource indicators to derive predicted network KPIs in step 135.

Due to the increase in mobile data usage, mobile operators have suffered unexpected network overloading to various extents over the past years. Nevertheless, mobile operators may not wish to constantly invest money for increasing network size. The traditional method for network resource planning, based on service traffic growth only, has failed to solve the dilemma between network capacity and money invested by mobile operators. Before the smart phone appeared, traditional mobile devices all behaved in a relatively similar manner since applications running on them were voice service and simple data services. The traffic model based upon that service scenario was stable and trend-able given a period of time. However, the traffic model based upon a service scenario with multiple smartphones accessing data services in addition to voice and text services is not as stable and trend-able due to unpredictable changes resulting from smartphone use, such as heavy signaling traffic, concurrent connections of new applications, and changes in the data traffic consumed by data application connection(s).

Traditional approaches to wireless capacity planning may consider one primary factor only, which is the number of subscribers in a geographic area. In one implementation, future capacity for traffic demand may be estimated based on a sum of a current capacity and an incremental capacity increase (or decrease) proportional to subscriber growth. Due to smart phones with diversified traffic patterns and user behaviors, an enhancement may be necessary to the future capacity for traffic demand to identify such diversities in the subscribers and services. To this end, another new dimension may be added to help determine the future demand. The new dimension may include incremental capacity by diversified smart phone behaviors and service growth. As such, the Future Capacity for traffic demand=current capacity+incremental capacity proportional to subscriber growth+incremental capacity by diversified smart phone behaviors and service growth.

Hence, a scientific approach may be useful to forecast network resources and determine optimal ways of spending money invested for increasing network capacity. In particular, some techniques described herein may rely on a joint projection of dynamic changes in the traffic model where the subscriber count, smart phone user behaviors, and service patterns are taken into account in a timely manner (e.g., within one week or one month). The subject technology, among other things, introduces a systematic methodology of data analytics and modeling to evaluate LTE network capacity based upon traffic measurements and service trends. The subject technology may address, among other things, two primary problems discussed below.

First, the subject technology may anticipate the dynamic changes in the traffic model due to the diversified services and user behaviors. Based on the anticipated dynamic changes, mobile operators may know which network resource(s) are most demanded or most useful, and may invest in expanding those resources. Furthermore, the capacity is supported by end to end network equipped resources, whose physical threshold (upper and lower bound) is determined by how different types of traffic generated by the diversified services and devices are effectively utilized on the software and hardware of the network equipment. A traffic model is developed with parameters that can represent the statistical characteristics of the network traffic and network resources. Any potential failure to compute accurately network resource threshold may seriously lead to network outage or service downgrading at least.

Second, the systematic method may be auto-tunable in computing network capacity to reflect the dynamic changes in the traffic model. The technique may include an incremental learning process to identify difficulties (e.g., pain points) in network capacity management and perform accurate network planning. Basically the model may answer several questions including when the network capacity may be timely added and how can the capacity expansion be implemented in a timely and cost-saving manner.

Big data analytics may include obtaining and processing measurable data of wireless networks to reveal information about mobile network resource usage (e.g., which resources are causing bottlenecks in mobile network traffic, to which additional resources should investment funds be directed, etc.) behind the data. There are at least two primary advantages of big data analytics over simulation in modeling a given problem in wireless networks. The big data analytics leverages true measured data rather than simulated dummy data or assumed scenario to study a given problem in the wireless networks. The measured data may reflect the network and user behaviors. As a result, there is a reason to believe that the analysis result is more reliable and trustworthy when an appropriate analytics algorithm is used to abstract the network problem to be investigated. The previously unknown patterns or situations of the wireless networks that may be hidden in the measured data can thus be discovered.

The big data analytics is normally a supervised learning, unsupervised learning or posterior learning process, using the measured data to infer a pattern, which may be used to represent the data to a certain degree of accuracy. As used herein, the phrase "supervised learning" may refer to a machine learning technique where one or more machines learn to classify or categorize input values based on a provided training set. For example, a machine may learn to classify photographs of animals as either "cat" or "dog" based on a provided training set that includes multiple photographs, which the one or more machines are told correspond to "cat," and multiple other photographs which the one or more machines are told correspond to "dog." Based on this provided training set, the one or more machines may learn to distinguish between photographs of "cats" and "dogs." In a posterior learning process, the one or more machines are provided with relevant data to consider, for example, a typical "dog" is larger than a typical "cat," or a typical "dog" has more teeth than a typical "cat." One difference between a traditional simulation approach and big data analytics approach to study the same problem in the wireless network is that the generalization process to reveal unseen situations (e.g., which network resource(s) are causing bottlenecks, which network resource(s) are under-used, etc.) in the wireless network is based upon true data in analytical learning or assumed scenario in simulation. Sometimes, simulation also applies true data in networks to abstract certain scenarios for further simulation. However, simulation does not impact the superiority of big data analytics mentioned above in studying network performance, capacity, and service quality problems in wireless networks.

In order to solve a given problem on network performance and capacity in Universal Mobile Telecommunications System (UMTS) or LTE networks, the following steps may be performed using the approach of data analytics and modeling:

First, a target network resource or KPI may be selected for evaluation. Exemplary target network resource(s) or KPI(s) are described below. The target network resource may include one or more of an average number of connected users per cell, a downlink physical resource blocks (PRB) usage or availability, an uplink physical resource blocks (PRB) usage or availability, a physical downlink control channel (PDCCH) usage or availability, a paging resource usage or availability, an average number of active users in an uplink buffer per cell, an average number of active users in a downlink buffer per cell, or a physical random access channel (PRACH) usage or availability. The KPI may include one or more of a voice call drop rate, a data call drop rate, a radio resource control (RRC) connection success rate, or a radio access bearer (RAB) setup success rate.

In data analytics, this step is to confirm the target objective, which may be determining, using a computerized algorithm, a function where the target network resource is a dependent variable. Some typical network resources at air interfaces that can represent wireless capacity, network coverage quality, and interferences in LTE and UMTS networks are Downlink Power, which is also known as Transmitted Carrier Power (TCP), Received Total Wideband Power (RTWP), Downlink and Uplink Channel Elements, Orthogonal Variable Spreading Factor (OVSF) Utilization, Reference Signal Receive Power (RSRP), Received Signal Strength Indicator (RSSI), Received Signal code Power (RSCP), and CPU Utilization if any.

In the second step, a representation of the input (e.g., independent variables) in the function discussed above may be determined. In this step, appropriate independent variables (e.g., one or more KPIs based on which the target network resource may be calculated) are selected. Typically, the selected input variables are transformed into an independent feature vector, which contains the information gain that is descriptive of the target network resource. In some cases, those input variables (features) are KPIs and/or other value(s) associated with the network showing high correlation to target network resources to be predicted. In some cases, the number of KPIs to be analyzed in predicting a target network resource value may not exceed a predefined value (e.g., six KPIs) to save computational resources (e.g., use of processors or memories) in the analysis and prediction.

Which features to be selected may determine the accuracy of the function. In some cases, a large number of input features to represent the target network resource may improve the reliability and accuracy of the model. In other cases, a smaller number of input features may be desirable to reduce the amount of data and thus computational time and resources used. Selecting appropriate independent variables may lead to generating a function that accurately predicts values of the target network resource based on the independent variables.

There are two primary steps to do feature (independent variable) selection in evaluating wireless network capacity. First, domain knowledge is leveraged to prepare a short list of independent variable candidates (network KPIs and counters) which possibly contain sufficient information to represent the dependent variable (a target network resource). For this, a Subject Matter Expert (SME) can be involved to recognize which variable is selected to join the algorithm training from domain knowledge perspective. Alternatively, automation may be used in addition to or in place of the SME, and variables may be automatically selected from a preexisting list of variables. For example, to forecast Transmitted Carrier Power, the following features may be selected: High Speed Downlink Packet Access (HSDPA) users in a cell and R99 Downlink Radio Bearers (RBs), which includes several types of RBs such as conventional, background, streaming, and interactive at different rates. These attributes may be selected since they highly determine the extent to which the transmission control protocol (TCP) is exhausted.

Second, statistical approaches are applied to filter the selected independent variable candidates with an ultimate target at: improving model interpretability, shortening model training times, enhancing generalization by reducing overfitting in the model, and maximizing the mean accuracy rate and minimizing the mean error rate of the model.

The second step finally confirms which independent variable is important for prediction of target network resources and how those independent variables are related. Some typical criteria to select best features for the model includes Akaike Information Criteria (AIC), Bayesian Information Criteria (BIC), Minimum-redundancy-maximum-relevance (mRMR), Information Gain, and Lasso etc.

The third step involves gathering a data set. A set of independent variables is gathered and corresponding dependent variables are also gathered from measurements in the wireless networks. The independent variables in the data set are measured data of those input features selected in step 2 while the measured data of dependent variables are the target network resources selected in step 1.

The overall data set is split into a training data set and test set. The training set is a set of data to discover potentially predictive relationships between independent variables and dependent variables, which are target network resources. The independent variables and dependent variables in the training set are used together with a supervised or unsupervised learning method to train the relationships between the response value, which is a target network resource, and the predictors, which are the independent variables. The training process is to fit a model that can be used to predict the target network resource from the independent variables selected in the second step.

The test set is a set of data with same independent variables and dependent variables that is independent of the training set. The test set may follow a similar probability distribution to the training set. The test set may be used to assess the strength and utility of the predictive relationship derived by the training set. If a model fit to the training set also fits the test set accurately, minimal over-fitting may have taken place, and the model may be assumed to be accurate. If the model fits the training set better than the model fits the test set, over-fitting may have taken place.

The fourth step involves model development, validation, and testing. In this step, the structure of the function and the structure of the algorithm for determining the function are determined. Several algorithm candidates are selected by domain knowledge to train the relationship between target network resource and network KPIs.

While performing machine learning to evaluate wireless network capacity, three primary steps may be followed. In the training phase, the model may be trained based on gathered data from real-life experience with the cellular network being studied. Training the model may include pairing the input (network KPIs) with expected output (target network resource). Each algorithm candidate has its own parameter options (e.g., number of layers in a Neural Network, etc.). For each of the algorithms, one option may be selected. A validation set may be used to determine the best option in each algorithm.

The validation/text phase begins when there is a collection of algorithms to predict target network resource. A best algorithm may be determined using a test set. The algorithm that performs best on the validation set may be selected. But, if not measuring the top-performing algorithm's error rate on the test set and just going with its error rate on the validation set, then the "best possible scenario" may be mistaken for the "most likely scenario." Thus, this step may include estimating how well the model has been trained and estimating model properties (e.g., mean error for predicting the network resource, classification errors in classifying network features, etc.).

Application Phase: The developed model is applied to the new data to predict network resource values. Since normally no reference value of target network resource in this type of data is available, the accuracy of predicted network resource may be tested, for example, using the results of the validation phase.

In order to provide adequate data for all stages of the training, validation and testing process, in some cases, 50% of the data may be allocated to training, 25% to testing, and 25% to validation. If no validation set is required, in some cases, 70% of the data may be allocated to training and 30% to testing. Above, a larger percentage is used for training than for other phases as training may be the most data-intensive and data-amount-sensitive stage. However, other percentage splits may be used in conjunction with the subject technology.

A more advanced approach is called cross-validation, which defines a data set to test the model in the training phase in order to limit problem of over-fitting, giving an insight on how the model will generalize to an independent data set. The most common cross validation is K-fold cross-validation and 2-fold cross-validation.

An analytical model may be useful in evaluating LTE network performance. In order to forecast LTE network capacity, which is represented by network resources, for example, those set forth above, an analytical model may be developed to derive the quantitative relationship between measured LTE network KPIs and forecasted network resource. Some techniques may leverage time series or other trending algorithms to forecast a given network resource by its own historical data. However, other techniques, such as those described herein, may be more advantageous.

First, in particular, the techniques described herein may be more advantageous because the causality is unknown to network capacity. Target network resource values may be forecasted based on a time series by applying regression techniques to relationships between time and network resource values. However, this scheme may not be informative regarding the network resource is quantitatively consumed by various applications or users whose traffic consumption is reflected by network KPIs. The consumption of network capacity and resource is due to the voice and data traffic that is generated by various applications run at mobile devices. To predict (trend) the perspective network capacity, the behaviors and the patterns of network resource consumers are to be recognized. These behaviors and patterns may be summarized, generalized, or represented by network KPIs. Thus a relational study may be performed to determine what causes network traffic—voice services, data services, applications, etc. —and which network resources are consumed by the network traffic.

Second, user and service behaviors are lost. If simply applying time series of network resource itself to forecast its own perspective values, many components such as user behaviors to consume traffic, diversity of traffic consumption between services, seasonality of traffic consumption, and random spikes may not be decomposed and derived. Measured network resource values may include comprehensive results representing how components are summed together, resulting in consumption of network resources. Hence, an approach to identify root sources that consume a network resource and how those root sources quantitatively use the network resource may be desirable.

As a result, in order to overcome the shortcomings of traditional methods, a relational model may be used to derive the quantitative relationship between LTE network KPIs and network resource indicators. Second, a forecasting algorithm is developed to forecast network KPIs. Last, the forecasted LTE KPIs are obtained by inputting the predicted network resource indicators in the relational model for KPI and resource indicators.

As discussed above, a given LTE network resource is consumed by voice and/or data traffic generated by device users. The traffic that is generated by device users can be quantitatively represented by LTE network traffic indicators. A qualitative schematic relationship may exist between a given LTE network KPI and its associated network resources.

Figure 2:
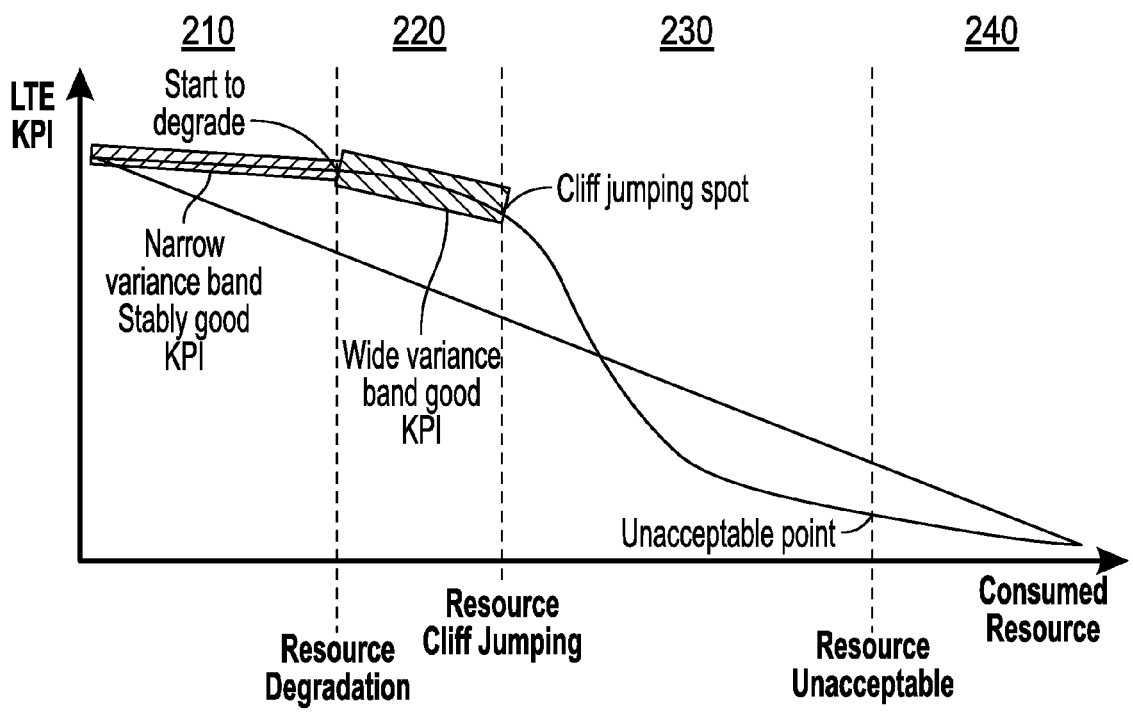
FIG. 2 illustrates an exemplary relationship between a LTE network key performance indicator and a consumed resource.
Figure 10:
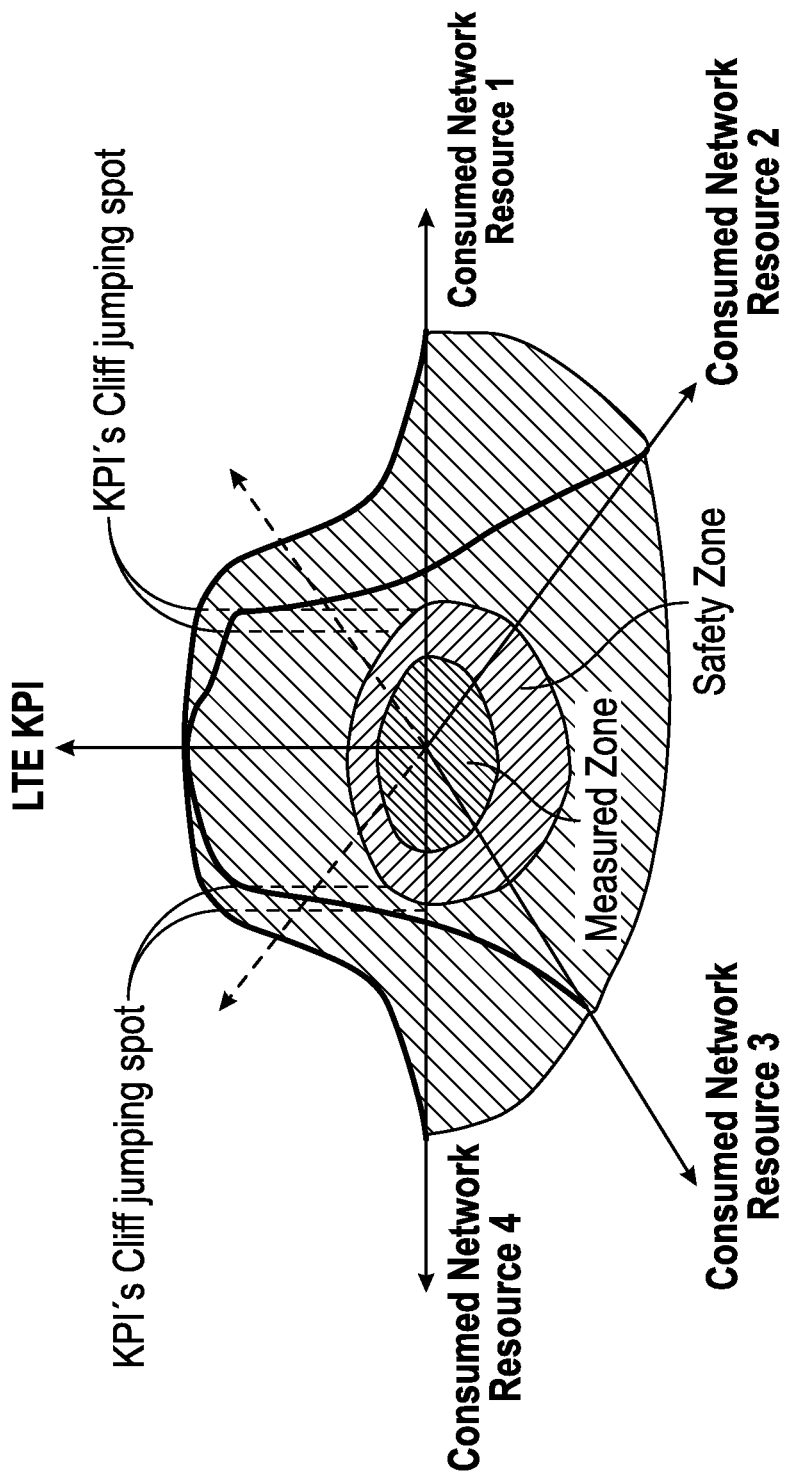
FIG. 10 illustrates an exemplary relationship between a LTE network key performance indicator and multiple consumed network resources.

FIG. 2 illustrates a relationship between a LTE network KPI and a consumed resource. As illustrated in FIG. 2, the X axis corresponds to the LTE network resource that is being consumed and the Y axis corresponds to the measured KPI. The LTE KPI as a function of LTE network consumed resources is split in four areas, separated by three dotted lines in FIG. 2. In FIG. 2, the larger KPI value reflects a better KPI. For instance, a high value of Radio Resource Control (RRC) Connections Setup Success Rate denotes a good RRC connection success rate. Similar to FIG. 2, FIG. 10 illustrates an exemplary relationship between a LTE network KPI and multiple consumed network resources.

Zone 210 of FIG. 2 defines a constantly good KPI. Consider a vanishing distribution of LTE network KPI, the KPI is first equivalent to the reference point at very beginning where almost no network resource is consumed, which means the LTE network is extremely lightly loaded. A slight growth of network resource consumption may not affect the KPI at all. For example, the data call drop rate in LTE networks is not much impacted when only a few users simultaneously occupy Dedicated Traffic Channels (DTCH) or Common Traffic Channels (CTCH).

Zone 220 of FIG. 2 defines a sinking KPI. At a particular point or in a certain range, the formal quasi-perfect KPI scenario may not be maintained any more. As the LTE network resource continues to be consumed, the KPI starts to degrade at a limited range where the variance of KPI is larger than that in the zone 210 since the Quality of Service (QoS) in the zone 220 is slightly deteriorated due to fewer remaining resources which are available. Such a scenario is reflected by the function having a slightly and increasingly negative gradient as the LTE network resource consumption continues to grow.

Zone 230 of FIG. 2 defines a cliff jumping KPI. As the LTE network KPI continues to degrade and once it exceeds a particular threshold, the quasi-flat relationship between KPI and consumed resource starts to collapse. As fewer and fewer available network resources are left, additional resource consumption can impose a considerable impact on the LTE KPI. Once the KPI level plunges to a very low level, which is shown in the right side of zone 230, consumption of additional network resources may not have much effect on the KPI.

Zone 240 of FIG. 2 defines an unacceptable KPI. As soon as the KPI drops beyond a particular point or a certain range, the KPI value beyond that point or range is no longer acceptable. The network may be out of service since a minimal QoS cannot be maintained.

In zones 220 and 230, the objective sensitivity of the LTE network KPI to consumed LTE network resource is more pronounced than in zones 210 and 240. Thus, in zones 220 and 230 when the KPI value is very high, a small additional resource consumed may strongly decrease the KPI. On the other hand, when the KPI drops to a very low level in the end of zone 230 and zone 240, a further resource consumed may not be perceived to significantly alter the KPI.

Consider the piecewise relationship from zone 210 to zone 240, it can be assumed that the change of LTE network KPI depends on the current level of KPI (alpha*KPI), given a certain amount of resource (Beta) to be changed. The relationship can be represented by the first step in Equation 1. After a transformation, the relationship between LTE KPI and resource is derived by Equation 1.

$$\frac{\partial KPI}{\partial \text{Re source}} \sim \alpha \cdot KPI + \beta \quad \text{Equation 1}$$

$$\frac{\partial KPI}{\partial \cdot KPI + \beta} \sim \text{Re source}$$

$$\int \frac{\partial KPI}{\alpha \cdot KPI + \beta} \cdot dKPI \sim \int \partial \text{Re source} \cdot d\text{Re source} \Rightarrow$$

$$KPI_{LTE} = A \cdot e^{-B \cdot \text{Re sources}} + C$$

At large, KPI=f(Resource1, Resource2, ..., Resource N) is a function of n influence factors in terms of resource 1 to n, so the pair-wise relationship between a given KPI to one network resource to a KPI to multiple related network resources can be expanded. Each relationship has a coefficient to denote its weight to KPI. That is, $$KPI_{LTE} = Coeff1 \times (A1 \cdot e^{-B1 \cdot \text{Re source1}} + C1) + \quad \text{Equation 2}$$

$$Coeff2 \times (A2 \cdot e^{-B2 \cdot \text{Re source2}} + C2) +$$

$$\ldots + Coeffn \times (An \cdot e^{-Bn \cdot \text{Re sourcen}} + Cn) =$$

$$\sum_{i=1}^{n} Coeffi \times (A1 \cdot e^{-Bi \cdot \text{Resourcei}} + C1)$$

Then the least square method may be applied to obtain the optimal coefficient coeff1–n, and optimal values of A, B, and C.

Generalized Additive Model (GAM) and Sigmoid Model are two alternative approaches to derive the relationship between the KPI and the resource indicators. Choosing a GAM or Sigmoid Model may overcome two drawbacks of Exponential Model in Equation 1 and 2.

First, in zone 210 the KPI presents a smooth and stable relationship (or approximately smooth and stable) to resource indicators while in zone 220 and zone 230 the KPI appears to have an exponential relationship (or approximately exponential relationship) to resource indicators. This is because in zone 210 the change of KPI is not sensitive to the change of resource indicators when the remaining resource is still highly sufficient. Therefore, the KPI maintains a relatively optimal and stable level when the physical resource is consumed at a low level, which is represented by small values of resource indicators in zone 210. As a result, the smooth gradient of KPI in zone 210 is difficult to represent using an exponential function. Zones 220 and 230, which are concave up, are more easily represented by an exponential function.

Second, there is a cliff jumping point between zones 220 and 230 to represent that the KPI starts to degrade sharply once the resources are consumed to a particular point. Since the exponential model behaves as a monotony function without a turning point, there is no inflection point to represent the cliff jumping point if the exponential model is used alone.

Linear models may be desirable because they are simple to fit, results are easy to understand, and there is a wide variety of useful techniques for testing the assumptions involved. Nonetheless, there are cases when the linear model may not be applied because of an intrinsic nonlinearity in the data. GAM provides a means for modeling such data. It models the nonlinear relationship, by entirely relaxing the linearity assumption. The advantage of this approach is obvious that both the smooth relationship in zones 210 and 220 and the sharply decreasing trend in zones 230 and 240 can be locally fitted. Another merit is the GAM can be easily extended to multi-dimension regression, which means the multiple resource indicators can simultaneously join the model for regression. There is no separated step 2 in Equation 2 to train the coefficient per resource indicator. One example of GAM based algorithm for the model is given by:

$$KPI_{LTE} = \alpha + f_{S1}(\text{Re source1}) + f_{S2}(\text{Re source2}) + \ldots + f_{Sn}(\text{Re sourcen}) + \epsilon \quad \text{Equation 3}$$

In Equation 3, fs provides the smoothing function for a given resource indicator. It represents the arbitrary function that can be estimated by GAM. Alpha indicates an intercept and epsilon represents a random error.

One advantage of Sigmoid Model is that the cliff jumping point can be derived by letting 2nd order derivative=0 in which the point at 2nd derivative changes sign. In addition, the smooth area in zones 210 and 220 can also be fitted by Sigmoid Curve, though the goodness of fitting in this area may not be as good as that fitted by GAM, which is a method of true "local fitting". The standard sigmoid function may be represented by:

$$y = f(x) = \frac{1}{1 + e^{-x}} \quad \text{Equation 4}$$

However, the sigmoid curve of the cliff jumping model may not be as perfect as the standard format. So the S-Curve function may be:

$$KPI_{LTE} = \quad \text{Equation 5}$$

$$f(\text{Re source}) = \frac{A \cdot 1}{1 + e^{-B \cdot (\text{Re source1} + C)}} = \frac{A}{1 + e^{B \cdot (\text{Re source} - C)}}$$

In Equation 5, A denotes the max value of KPI. B denotes the curvature of the sigmoid curve. In circular function, B may be referred to as phase. C denotes inflection point of the sigmoid curve. According to Equations 4 and 5, Equation 2 can be revised as below.

$$KPI_{LTE} = Coeff1 \times \left(\frac{A1}{1 + e^{B1 \cdot (\text{Re source}_1 + C_1)}}\right) + \quad \text{Equation 6}$$

$$Coeff2 \times \left(\frac{A2}{1 + e^{B2 \cdot (\text{Re source}_2 - C_2)}}\right) +$$

$$\ldots + Coeffn \times \left(\frac{An}{1 + e^{Bn \cdot (\text{Re sourcen} + Cn)}}\right) =$$

$$\sum_{i=1}^{n} Coeffi \times \left(\frac{Ai}{1 + e^{B2 \cdot (\text{Re source2} - C2)}}\right)$$

Figure 3:
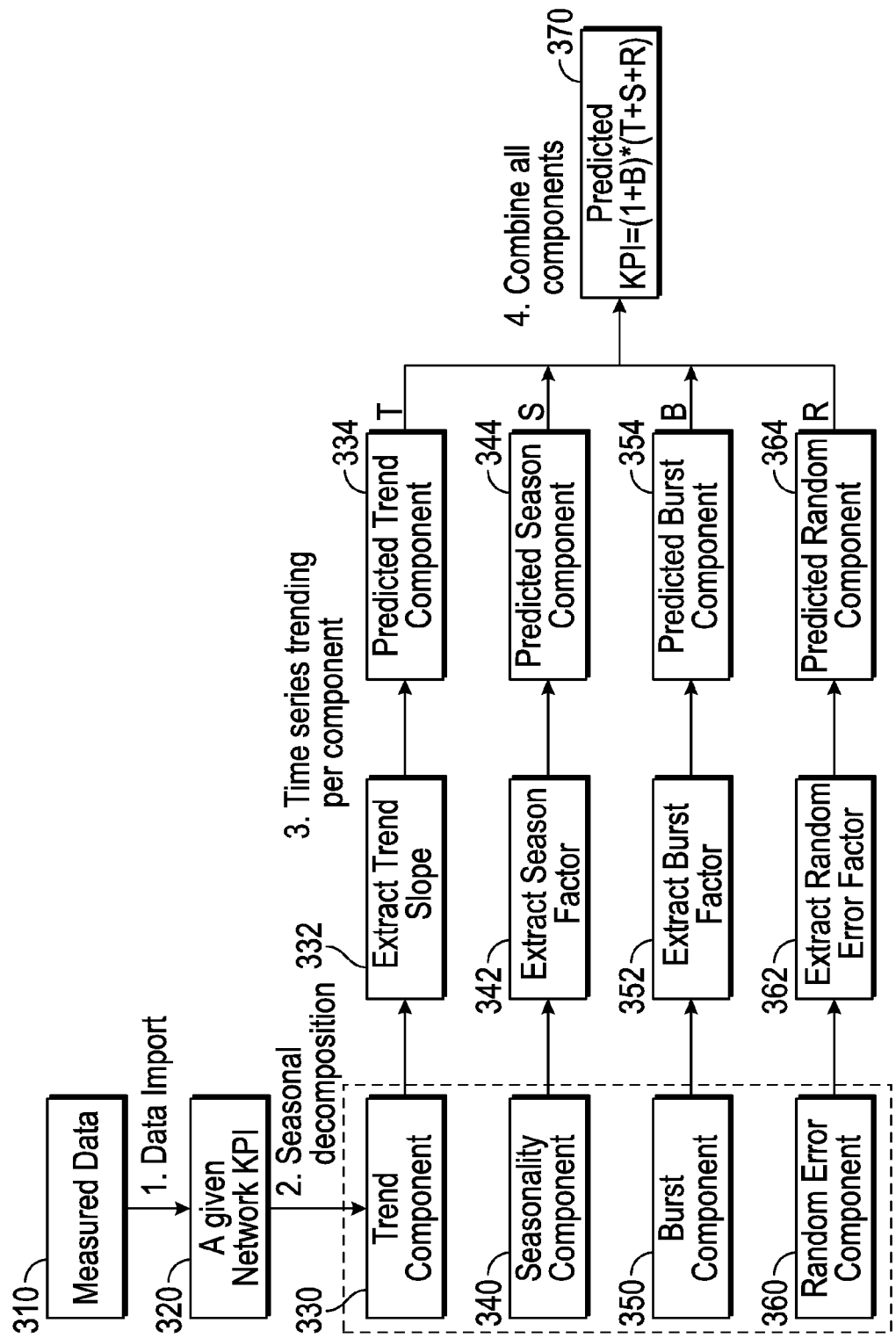
FIG. 3 illustrates an exemplary flow chart forecasting LTE network traffic and resource(s)

LTE traffic and network resources may be forecasted. In a given LTE network, any network traffic related indicators or resource indicators can be measured per carrier, per sector, or per cell level. The time granularity per KPI is normally per hour. For a given cell in a LTE network, a given network traffic indicator or resource indicator in a given period (ti to tj) can be given by X(t)={X(ti), X(ti+1), . . . , X(tj)}. The X(t) may be decomposed to four components: Trend component T(t), Seasonality component S(t), Burst component (B), and Random error component (R), so X(t)=(1+B(t))*(T(t)+S(t)+R(t)). FIG. 3 illustrates this model.

Trend component: Trend component T(t) reflects how user behaviors, rate plan policy, and change of user numbers impact LTE network traffic and network resource consumption in a long term. Trend component T(t) represents the base value of X(t) in a certain lengthy period (e.g. 30-90 days) with a large granularity (e.g. per day).

Next, the measured time series of the given KPI X(t) is split to several pieces, each having a length of m. In a short term prediction, such as 0-60 days, m is assigned 10 days; in a middle term prediction ranging from 60-180 days, m is assigned 20 days; in a long term prediction more than 180 days, m is assigned 30 or more days. The u−2sigma and u+2sigma models may be applied to the input and output values of the model, for example, at 95% confidence level as the lower and upper bound to exclude the outliers (e.g., extreme values that represent very unusual circumstances or may have been measured incorrectly). If the time series does not present normal distribution, meaning it fails in normality tests, Inter-Quartile Range (IQR) may be applied to exclude outliers. Afterwards, the m pieces of data may be combined using piecewise fitting. The trend component is given by equation 7.

$$T(t)=f\{X_K, \text{Slope}_K\} \quad \text{Equation 7}$$

In Equation 7, $X_k$ denotes the first fitted value in each piece k. $\text{Slope}_K$ denotes the slope of piece k. The fitting process may be:

1. Divide the time series of KPI X(t) to m pieces.
2. For piece k=1, fit a line with $\text{Slope}_K$ and starting point=Xk.
3. For piece k=2 to m, fit a line with $\text{Slope}_K$ and starting point of Line K=the last fitted point of LineK−1. This makes sure each fitted line is interconnected without any gap between lines.
4. Minimize the mean error rate between fitted value and true value in each piece K=1 to m.

Other approaches for determining the trend component, as well as approaches for determining the seasonality component S, burst component B, and random error component R are discussed below, for example, in conjunction with FIG. 12.

As shown in FIG. 3, measured data is imported in step 310. In step 320, a given network KPI is selected from the imported data. The given network KPI is decomposed into a trend component in step 330, a seasonality component in step 340, a burst component in step 350, and a random error component in step 360.

Processing of the trend component is as follows. In step 332, the trend slope is extracted. In step 334, the trend component T is predicted. Processing of the seasonality component is as follows. In step 342, the season factor is extracted. In step 344, the season component S is predicted. Processing of the burst component is as follows. In step 352, the burst factor is extracted. In step 354, the burst component B is predicted. Processing of the random error component is as follows. In step 362, the random error factor is extracted. In step 364, the random component R is predicted.

The four components are decomposed from measured network traffic. For example, network traffic may be measured at 6 PM on a Monday, and the technique described above may be used to extract the four components from the 6 PM measurement.

Decomposition may be completed before prediction because the pattern and traffic behavior for each individual component is easier to capture and measure than the combined overall pattern and traffic behavior. For example, the trend components indicates the how user behavior, rate plan policy, and change of user numbers impacts the traffic in a lengthy given period such as 30-90 days. If the trend is not first decomposed from the combined overall traffic in each measurement point, the nature of trend factor may be lost or mixed with other components (e.g., seasonality, burst, and random variation).

In step 370, all of the components B, T, S, and R are combined to generate a formula for the predicted KPI. For example, the formula may be Predicted KPI=(1+B)*(T+S+R). The predicted KPI formula combines the four components to predict the combined overall traffic value. The format is defined generally based on the nature of network traffic. In some cases, B, T, S, or R may be preceded by coefficient(s), which may be derived using a data mining process with the training data set.

Figure 4:
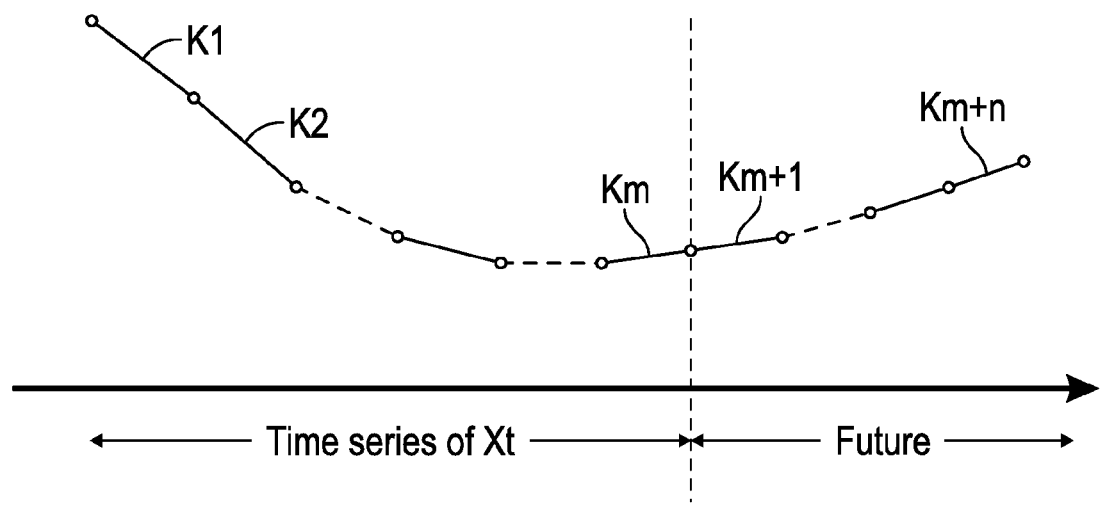
FIG. 4 illustrates an exemplary graph of a predicted trend component.

FIG. 4 is a graph illustrating an example of a predicted trend component.

In some particular scenarios, for example, as shown in FIG. 2, the network traffic and resource consumption decrease or increase sharply very quickly (e.g., in zone 230) and then go through a turning point and gradually increase or decrease very slowly (e.g., in zone 240). For example, in a school area, the network traffic may decrease sharply during summer and winter break as students and teachers may be absent during these periods. Then, the traffic stays relatively stable at a low level for a certain period (i.e., during the breaks). At last, it grows to a high level when a new term begins. Such up and downs in a long term are insufficient to be recognized as either bursts in a very short period (e.g. hourly spikes) or seasonality in a short period (e.g. 1-2 weeks). Instead, the variations may be explained by the trend component as a change in the long term. However, in $2^{nd}$ order exponential smoothing, the rapidly decreasing intervals provide much more weight than slowly increasing intervals in determining the perspective slopes. Hence, no matter how the smoothing coefficient is optimized, a possible fact is the perspective slope will be negative forever. This causes the forecasted values to be negative values, which is meaningless. As a result, there is a need to improve the algorithm above by compensating those super decreased or increased gradient in a short period. A compensation formula may be expressed as follows: if recent N successive slope are greater than zero, the perspective slope may be greater than or equal to zero. The formula is given by:

$$K_{T+i}^1 = \text{Max}\{K_{T+i}, \gamma, \min\{K_T, K_{T+1}, K_{T+2}, \ldots K_{T-N+1}\}\} \quad \text{Equation 8}$$

Figure 5:
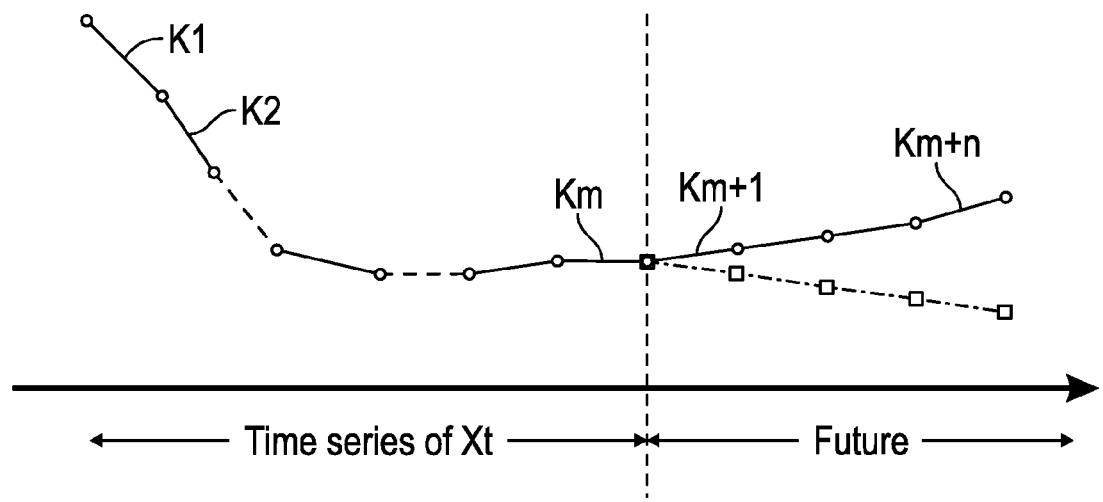
FIG. 5 illustrates an exemplary graph illustrating compensated super decreased slopes.

In Equation 8, γ is a constant that can be tuned until optimal. $K_{T+i}^1$ denotes the improved slope after compensation. FIG. 5 is a graph illustrating an example of compensated super decreased slopes.

Seasonality (period) component: The seasonality component represents the periodical changes of traffic in a given period. Wireless traffic or resource consumption normally has a weekly period (7 days), which means the traffic of any two adjacent 7 days are highly correlated. For example, network traffic on Wednesday, Mar. 26, 2014, may be correlated with network traffic on Wednesday, Mar. 19, 2014, seven days (one week) earlier due to similarities in human behavior on Wednesdays.

To forecast seasonality component, the length of each period may be obtained.

1. Assume the length of time series for a given LTE KPI is L. Assume the possible period length i=1 to L/2. In each i, there are j pieces. For example if l=1, max j=1; if l=3, max j=3, etc.
2. For i from 1 to L/2, compute the variance for each piece j in each i. That is $\sigma_{ij}^2$. The variance may be computed based on a sum of square deviations (between a predicted and an actual value) within each piece.
3. Sum variance of each piece j in each period i. That is represented by $\sigma_{i\_Within}^2 = \Sigma_{j=1}^{J} \sigma_{ip}^2$. In other words, sum the variance for each period within the same i, which is within-group-sum-of-error $SS(W)_i$.
4. For each i from 1 to L/2, assume p=the number of sample points in each piece for each i. Note that p=L/i. When I=1, p=L; When i=2, p=L/2, . . . , etc.
5. For each i from 1 to L/2, construct p sets of sample data, each of which includes all the samples in the same position in the p pieces (q=1 . . . p). Compute the variance of each p, which is given by $\sigma_{ip}^2$
6. Sum the variance of each piece p in each period i. That is represented by $\sigma_{i\_Between}^2 = \Sigma_{q=1}^{P} \sigma_q^2$. In other words, sum the between-group variation, which is $SS(B)_i$
7. For each i from 1 to L/2, select the i with minimized $\sigma_{i\_Between}^2 / \sigma_{i\_Within}^2$.

Alternatively, Analysis of Variance (ANOVA) may be used to select the i most significant F scores.

After the length of period is obtained, the value of the seasonality (period) component per period may be derived. The value of seasonality component in each position q (q= 1 . . . p) is given by the mean value of data points at the same position q in the p sample sets.

$$S_{pi}(t) = \sum_{q=1}^{p} X_{qi} / p \qquad \text{Equation 9}$$

The burst component B(t) indicates a significant change from a normal trend. The burst component is caused by external known or unknown factors. Those known factors are predictable such as holidays (e.g., Thanksgiving or Christmas), special events (e.g., Black Friday or state sales tax holiday), or cultural festivals (e.g., Super Bowl Sunday or Presidential Election Day), etc. The unknown factors, which are by their nature unpredictable, may be caused by random events with small probability. For example, many users may make calls simultaneously, generating a large amount of traffic at the same short amount of time.

A burst in the model is defined as a suspicious resource indicator or traffic indicator measured value exceeding a predefined threshold. For example a value above ¾ quartile or u+2sigma can be identified as a burst point. A more dynamic way to identify a burst is to compare its value with the trend component. If the percentage is above a certain threshold, which is tunable, say 120%, the value may be identified as a burst.

$$B(t)_{Value} = \{Burst_{t1}, Burst_{t2}, \ldots Burst_{tm}\} \qquad \text{Equation 10}$$

Then the geographical scene is determined for the given cell, as is the approximate interval for various possible events such as holidays, sports games, etc. The burst type is next matched to a burst value for a burst Time.

$$B(t)_{Type} = \{Burst_{Type1}, Burst_{Type2}, \ldots Burst_{Typen}\} \qquad \text{Equation 11}$$

The next step is to observe whether such bursts regularly appear in a given fixed interval. If yes, the given burst is confirmed as a routine burst rather than an ad-hoc burst (e.g., corresponding to a random spike as described below). The routing bursts are recorded to a Burst Table for each cell with the information below.

$$B(t) = \{CellID, B(t)_{Value}, B(t)_{Type}, B(t)_{Time}\} \qquad \text{Equation 12}$$

The random error component R(t) can further be decomposed to a stationary time series RS(t) and white noise RN(t).

The measured value of the LTE resource indicator or network traffic indicator minus the sum of the first three components is the estimated value of the random error component. The random error component at each busy period is given by the mean value of the random error component at each busy period.

The model(s) described herein may be used to study and test LTE network performance. Based on the studying and testing of the LTE network performance, resources allocated to the LTE network may be adjusted. For example, more cell towers may be provided in a geographic location that has a large number of dropped calls or a large subscriber growth. If a certain network resource is a bottleneck in processing network traffic in a geographic area, more of that network resource may be provided to the geographic area. Techniques disclosed herein may be used, among other purposes, to estimate, to a certain degree of accuracy, the LTE network performance and forecast network resource usage. As a result, a mobile operator may ensure the quality of its cellular network and, therefore, the satisfaction of its customers with the quality of its network.

Five primary categories of LTE KPIs may be used to represent performance and service quality of the LTE Evolved Universal Terrestrial Radio Access Network (E-UTRAN): accessibility, retainability, integrity, availability, and mobility. Some aspects of the subject technology are focused on modeling the performance of accessibility and retainability in LTE networks.

ITU-T E.800 defines that accessibility refers to the probability that the user of a service, after a request to a network, receives the proceed-to-select signal within specified conditions. Accessibility in LTE is the ability of a user to obtain the requested service from the LTE network. RRC connection and ERAB setup are the main procedures of accessibility. Thus, RRC Connection Setup Success Rate and ERAB Setup Success Rate are typical KPIs to represent LTE network performance in terms of accessibility. Retainability is defined as the ability of a user to retain his/her requested service for the required duration once connected. Call Drops is a typical KPI to represent retainability in both UMTS and LTE networks.

RRC connection establishment may be used to make the transition from RRC Idle mode to RRC Connected mode. User equipment (UE) may make the transition to RRC Connected mode before transferring any application data, or completing any signaling procedures. The RRC connection establishment procedure may be initiated by the UE but can also be triggered by the network. For example, the UE triggers RRC connection establishment if the end-user starts an application to browse the internet or to send an email. Similarly, the UE triggers RRC connection establishment if the UE moves into a new Tracking Area (TA) and has to complete the Tracking Area Update signaling procedure. The network triggers the RRC connection establishment procedure by sending a paging message. This could be used to allow the delivery of an incoming SMS or notification of an incoming voice call.

Figure 6:
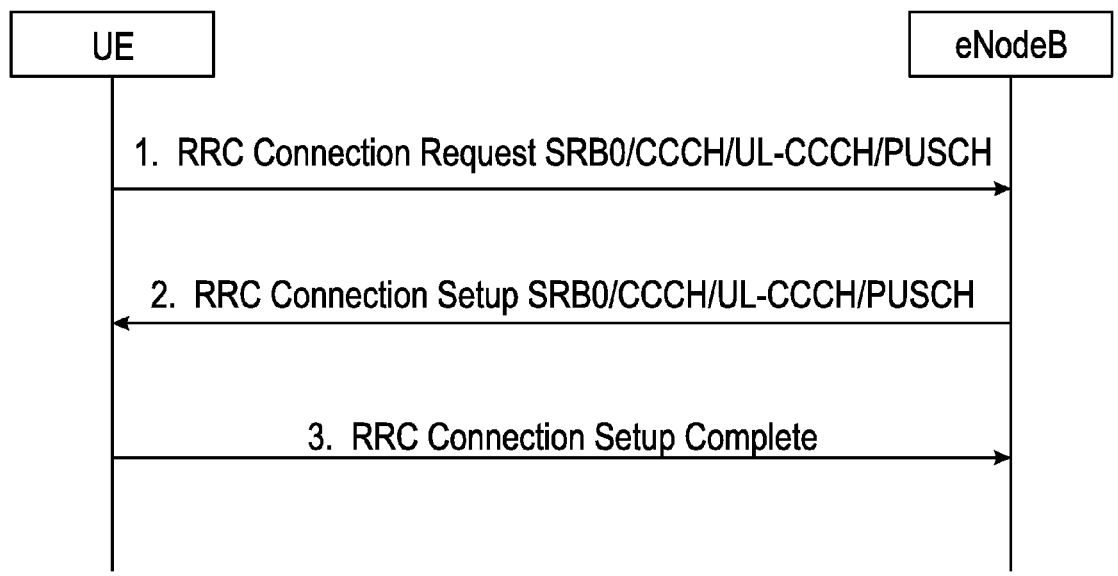
FIG. 6 illustrates an exemplary RRC connection setup.

FIG. 6 illustrates an example of the signaling for RRC connection establishment. The entire procedure is completed using only RRC signaling. A 3-way handshake is used to move the UE into RRC connected mode. The content of the RRC Connection Request message includes a UE identity field and an establishment cause field: emergency, high priority access, MT (mobile terminating)-Access, MO (mobile originating)-Signaling, and MO-data.

The RRC Connection Setup message configures Signaling Radio Bearer (SRB) 1 and allows subsequent signaling to use the Dedicated Control Channel (DCCH) rather than the Common Control Channel (CCCH) used by SRB 0. SRB 2 may be configured after security activation so the RRC Connection Setup message does not include any information regarding SRB 2.

The KPI-RRC Connection Setup Success Rate evaluates the RRC setup success rate with service-related causes in a cell or cluster involved. This KPI describes the ratio of all successful RRC establishments to RRC establishment attempts for UTRAN network, and is used to evaluate UTRAN and RNC or cell admission capacity for UE and/or system load. It is a primary KPI to evaluate LTE accessibility performance.

RRC Connection Setup process is highly correlated to a few typical LTE capacity (resource) indicators as below. They include, for example, average number of connected users per cell, Downlink Physical Resource Blocks (PRB) Usage, Uplink PRB Usage, Physical Downlink Control Channel (PDCCH) Usage, average number of active users in the uplink buffer per cell, average number of active users in the downlink buffer per cell, and Physical Random Access Channel (PRACH) Usage.

The average number of connected users per cell resource counter indicates the number of active users in RRC-connected state. This number measures the LTE resource in terms of average number of LTE users in a given cell, may include all connected synchronized and asynchronized LTE users in a cell and is effective to the resource-Channel Element (CE) in 3G networks. The average number of users in a cell may not accurately reflect the extent to which the LTE resource is consumed. However, it truly reflects how many uplink control channels are occupied along with their state indicators such as Sounding Reference Signal (SRS), Channel Quality Indicator (CQI), Rank Indicator (RI), and Pre-coding Matrix Indicator (PMI), etc.

In the LTE system, a given new user added in the network will consume certain RF resource and transmission resource. UE can shift the state between RRC-Idle and RRC-Connected. As a result, excessive connected users may cause that new service call not to be accessed and existing service quality of connected users may be downgraded. A number of existing users in a cell may be used to determine how many resources can be left to allow a new RRC to be connected successfully.

Downlink Physical Resource Blocks (PRB) Usage

PRBs are the basic air interface resources. This parameter measures the usage of uplink or downlink PRBs in a cell. A PRB resource is shared among all connected users. Higher usage of PRB indicates either a high amount of service usage per user or large number of connected users, both of which impacts user access and reduce existing users' quality of experience. Downlink PRBs are occupied by the PDSCH and PDCCH in time division mode. Therefore, the number of used downlink PRBs is the number of PRBs on the PDSCH. The counters measure the average number of used downlink PRBs in a cell. They are used to analyze the usage of downlink PRBs.

Regarding uplink PRB usage, similar to downlink PRB, the number of used uplink PRBs are occupied by the PUSCH and PUCCH in frequency division mode. The PRBs at both ends are used for the PUCCH, and the PRBs in the middle are used for the PUSCH. The number of PRBs used on the PUCCH and PUSCH is the number of used uplink PRBs. The counters measure average number of used uplink PRBs in a cell.

Regarding PDDCH usage, PDSCH is the key channel for communicating information to the UE. PDSCH usage is represented by Downlink PRB usage. On the other hand, PDCCH communicates "who" the data is for, "what" data is sent, and "how" the data is sent over the air in the PDSCH. The PDCCH specifies the set of PDSCH Resource Blocks used to transfer the RRC Connection Setup message. The RRC Connection Setup message is transferred using SRB 0 on the CCCH. PDCCH usage thus impacts RRC Connections and measures the number of control channel elements (CCEs) that can be used by the PDCCH. It is a typical resource counter highly correlated to RRC Connections.

Paging Resource Usage

LTE paging messages utilize PDSCH and PDCCH channels in the physical layer. The LTE paging messages are highly correlated to PRB resource usage and PDCCH resource usage. To estimate Paging Resource Usage, both paging attempts and discarded paging messages may be considered. This resource counter can be decomposed to 3 sub-counters: number of received paging messages over the S1 interface in a cell, number of paging attempts over the Uu interface in a cell, and number of discarded paging messages over the Uu interface in a cell. Paging resource usage is less correlated to connected users in a cell while is more determined by Tracking Area Code (TAC) users. Once the paging load in a cell exceeds its own capability threshold, the paging messages may be discarded and furthermore may cause low RRC connection rate and low call retention rate. In advanced smartphone networks, such as LTE, paging messages and data share utilized physical resources. Thus, paging is less likely to be a bottleneck of resources in LTE than in traditional primary voice networks, such as CDMA. However, paging resource usage is still a counter to be considered to evaluate RRC Connection Setup Success Rate.

The average number of active users in the uplink buffer per cell counter measures the average number of active users with data transmitted in the uplink buffer in a cell. It reflects the number of users simultaneously transmitting data in the uplink buffer in the cell. Thus, this resource counter effectively represents how the physical resource per cell is instantly utilized.

Similarly, the average number of active users in the downlink buffer per cell counter measures the average number of active users with data transmitted in the downlink buffer in a cell. It reflects the number of users simultaneously transmitting data in the downlink buffer in the cell. Thus, this resource counter also effectively represents how the physical resource per cell is instantly utilized.

Turning to the PRACH Usage resource, PRACH transmits preambles during contention-based or non-contention-based random access procedures. The LTE RACH process happens in the following situations: initial access from RRC_IDLE; RRC Connection Re-establishment procedure; handover; DL data arrival during RRC_CONNECTED requiring random access procedure, for example, when the UL synchronization status is "non-synchronized"; UL data arrival during RRC_CONNECTED requiring random access procedure, for example, when the UL synchronization status is "non-synchronized" or there are no PUCCH resources for SR available; and for positioning purposes during RRC_CONNECTED requiring random access procedure; e.g., when timing advance is needed for UE positioning. All the situations above except handover are related to the RRC Connection process, making this resource counter highly correlated to the RRC Connection Setup Success Rate.

Furthermore, the random access procedure takes two distinct forms: contention based (applicable to first five events); or non-contention based (applicable to only handover, DL data arrival, positioning and obtaining timing advance alignment for a sTAG). Hence the PRACH usage is one of two types: contention Preamble Resource Usage, and non-contention based Preamble Resource Usage.

Figure 7:
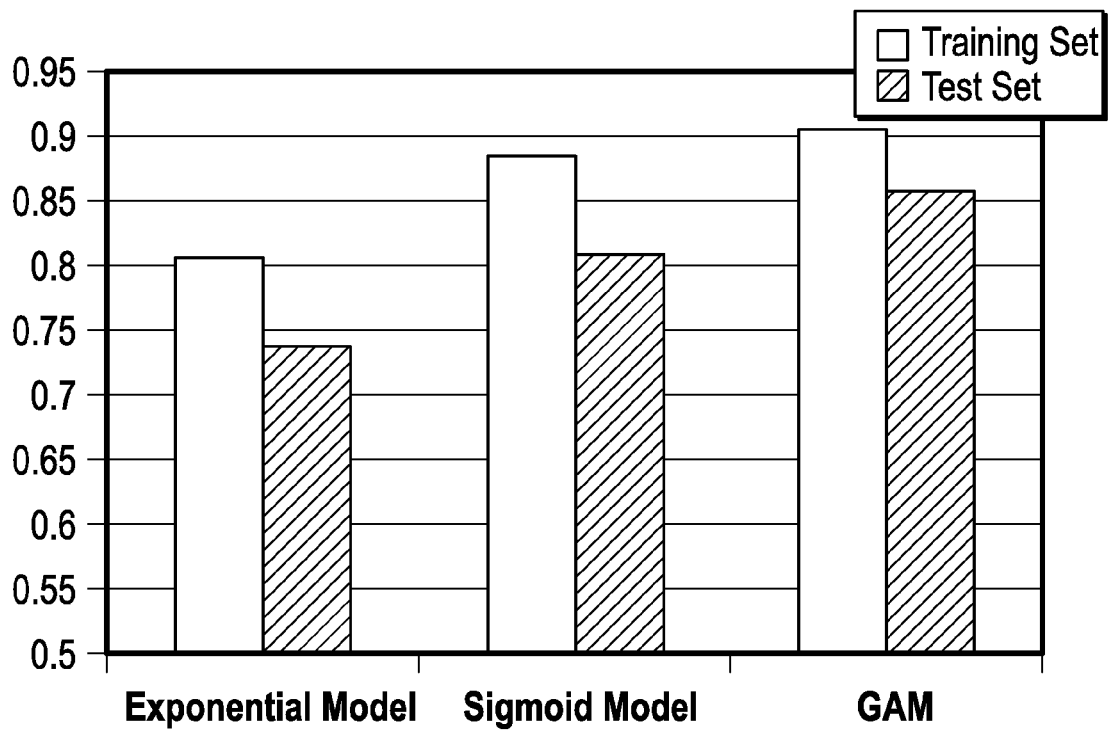
FIG. 7 illustrates an exemplary Mean Absolute Percentage Accuracy for some models.
Figure 8:
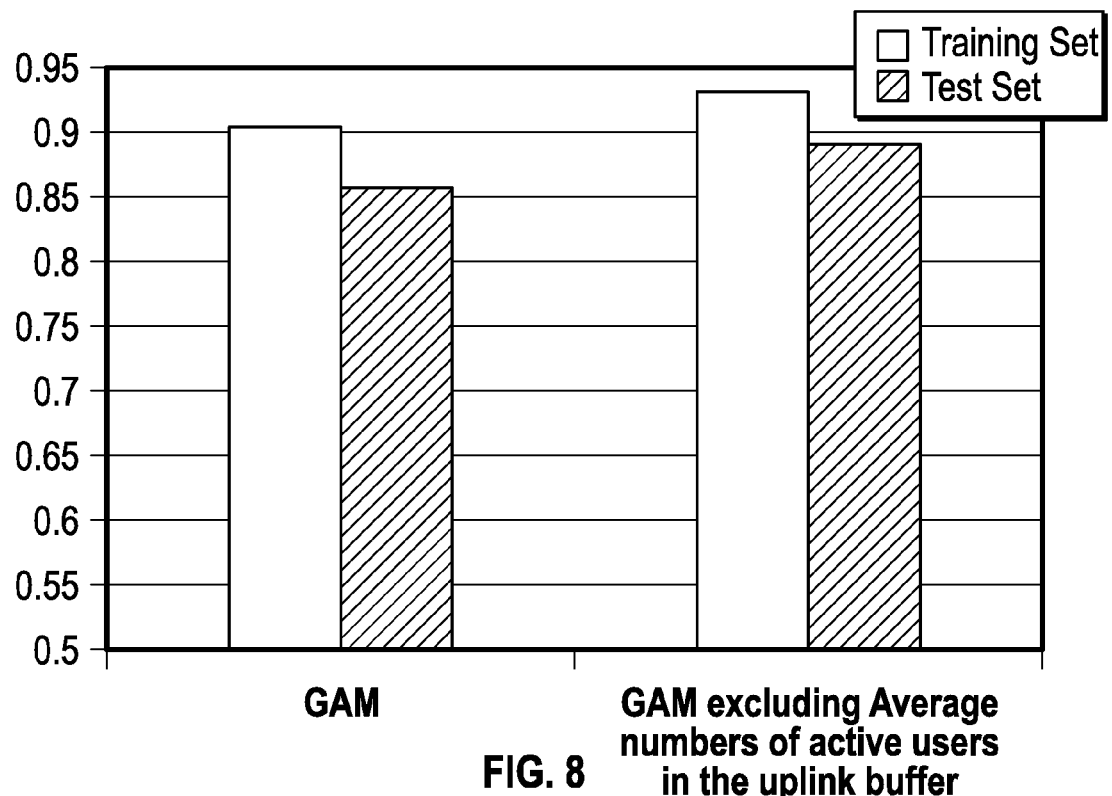
FIG. 8 illustrates an exemplary Mean Absolute Percentage Accuracy for additional models.

The relationship between RRC Connection Setup Success Rate and LTE Capacity (Resource) Indicators may be derived using equations 1-6. A sample of data from multiple cells may be randomly split into training set (e.g., 70% of the sample of data) and testing set (e.g., 30% of the sample of data). The sample may include multiple sample points with hourly granularity. The three algorithms are applied to train the statistical relationship for RRC Connection Setup Success Rate and the resource indicators. Mean Absolute Percentage Error (MAPE) is estimated to compare the accuracy and reliability of the three algorithms developed from Equations 1 to 6. FIG. 7 illustrates an exemplary Mean Absolute Percentage Accuracy (MAPA)=1−MAPE for the three models. Also, FIG. 8 illustrates an exemplary Mean Absolute Percentage Accuracy for additional models.

Figure 9A:
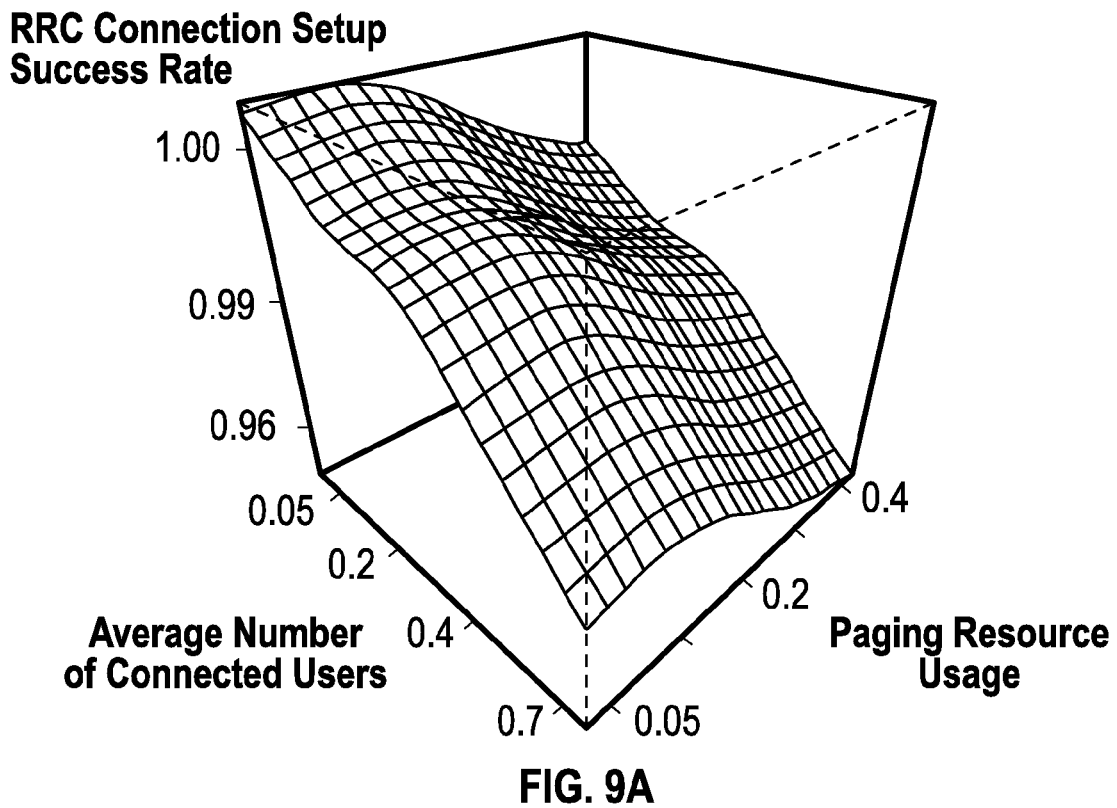
FIGS. 9A-9D illustrate exemplary graphs of relationships of a RRC connection setup success rate to other variables.
Figure 9B:
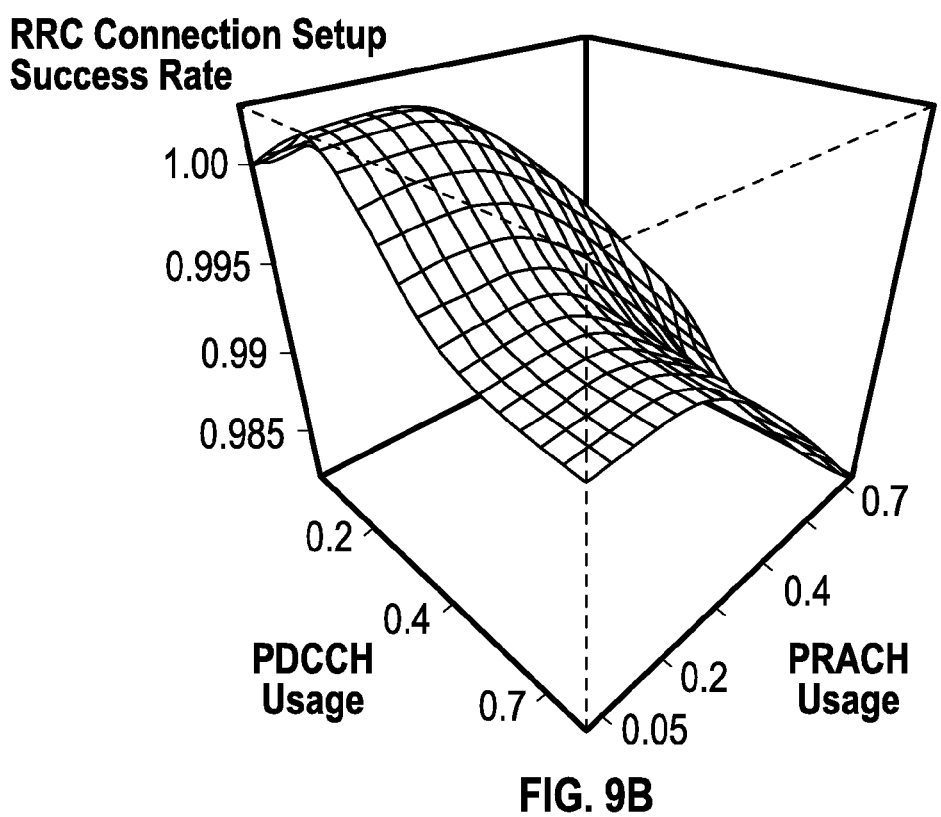
Figure 9C:
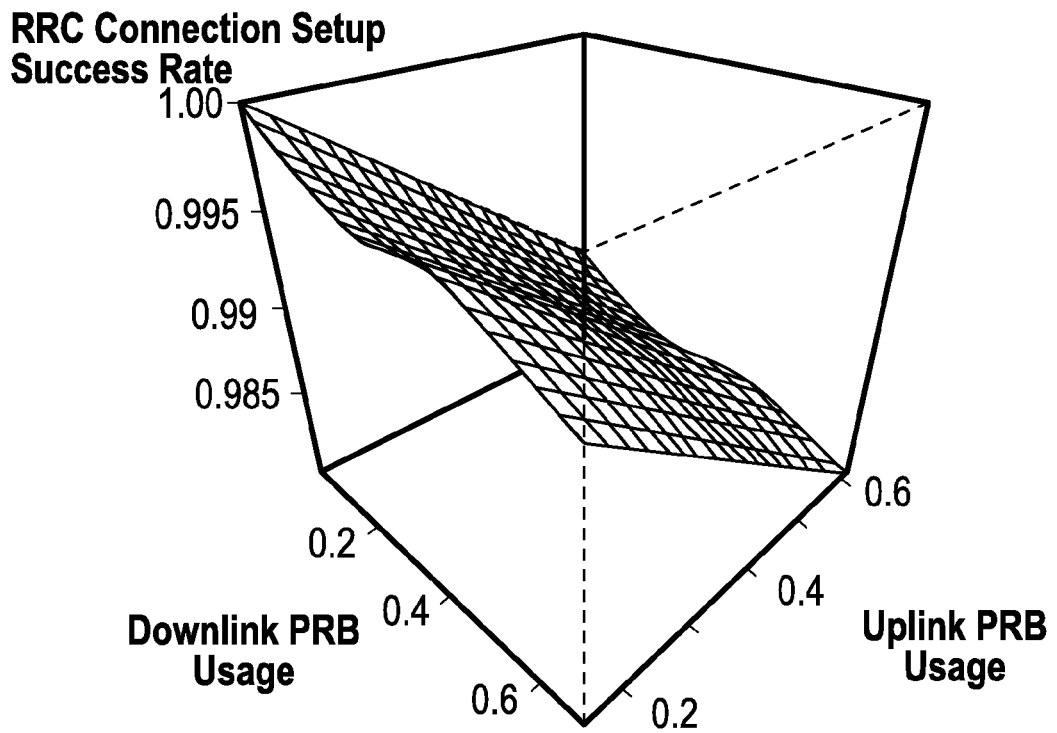
Figure 9D:
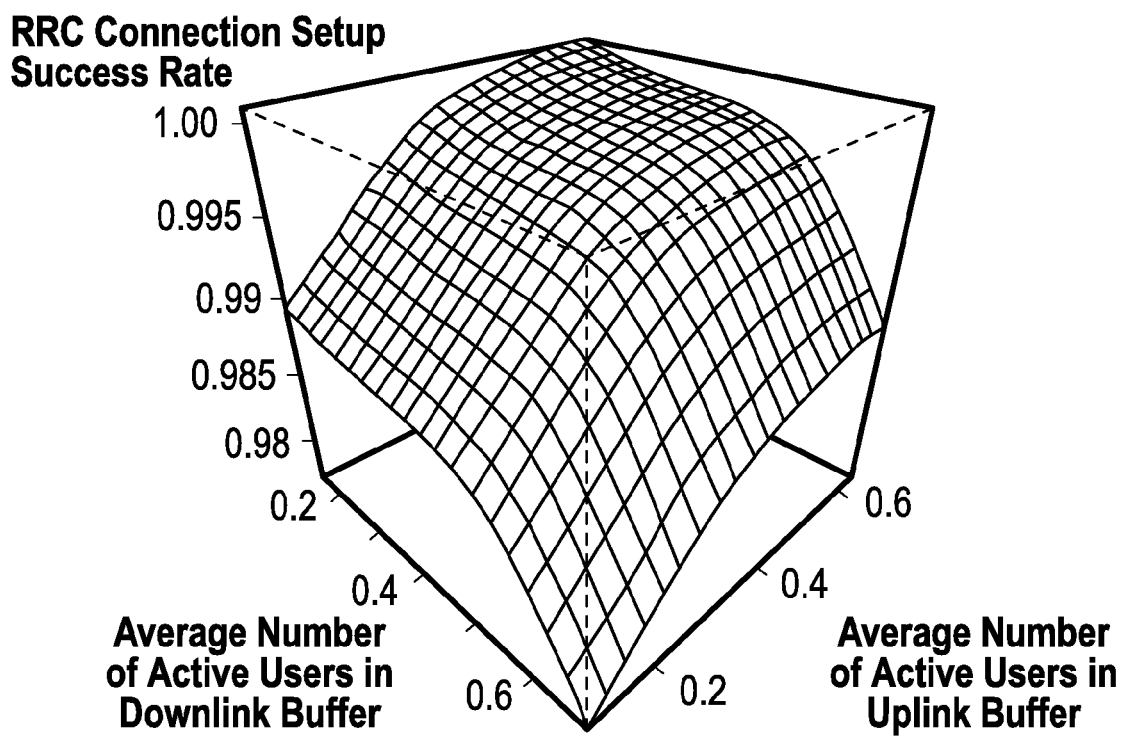

FIGS. 9A-9D include exemplary graphs illustrating relationships of the RRC connection setup success rate to other variables. FIG. 9A illustrates the relationship of RRC connection setup success rate to the average number of connected users and paging resource usage. FIG. 9B illustrates the relationship of RRC connection setup success rate to PDDCH Usage and PRACH Usage. FIG. 9C illustrates the relationship of RRC connection setup success rate to Downlink PRB Usage and Uplink PRB Usage. FIG. 9D illustrates the relationship of RRC connection setup success rate to the average number of active users in the downlink buffer and to the average number of active users in the uplink buffer.

In addition to being used to study LTE networks, the model described herein may be used to study the performance of networks such as 2G, 3G, UMTS, GPRS, GSM, and CDMA for the reason that the relationship between a network KPI and its associated network resource indicators in any given network can be derived based upon the relational model.

Figure 11:
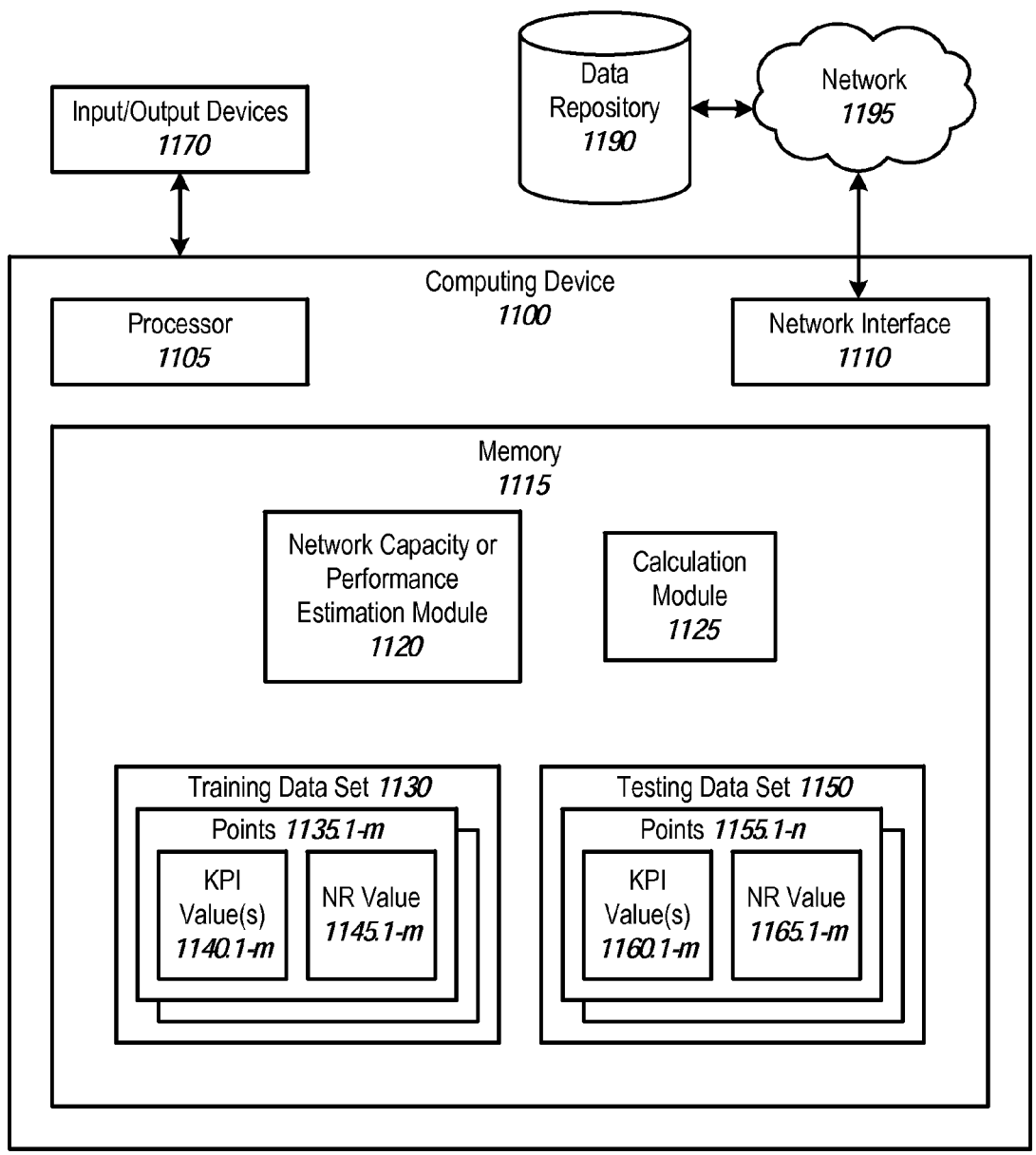
FIG. 11 illustrates an exemplary computing device for estimating network capacity or performance.

FIG. 11 illustrates an exemplary computing device 1100 for estimating network capacity or performance. The computing device 1100 may be a server computing device or a client computing device, for example, a laptop computer, a desktop computer, a tablet computer, a mobile phone, etc. As shown, the computing device 1100 includes a processor 1105, a network interface 1110, and a memory 1115. The computing device 1100 is coupled with input/output devices 1170, for example, one or more of a keyboard, a mouse, a display unit, or a touch screen, allowing for user interaction with the computing device.

While a single processor 1105 is illustrated, the computing device 1100 may have multiple processors. The multiple processors may be arranged into processing unit(s), for example, a central processing unit (CPU) or a graphics processing unit (GPU). The processor 1105 may execute instructions stored in a machine-readable medium, such as the memory 1415.

The network interface 1110 allows the computing device 1100 to interface with the network 1195, for example, transmitting and receiving data via the network 1195. The network 1195 may include a wired network, a wireless network, a local area network, a wide area network, the Internet, an intranet, a virtual private network (VPN), etc. Using the network interface 1110, the computing device 1100 may access data stored in a data repository 1190 connected to the network 1195.

The memory 1115 may include a long-term memory, a short-term memory, a cache unit, or a storage unit. The memory 1115 stores data or instructions. As shown, the memory 1115 stores a network capacity or performance estimation module 1120, a calculation module 1125, a training data set 1130, and a testing data set 1150.

The training data set 1130 stores multiple points 1135.1-$m$, where each point 1135.$k$ (where k is a number between 1 and m) includes key performance indicator (KPI) values 1140.$k$ and a network resource (NR) value 1145.$k$. The NR value 1145.$k$ corresponds to the network resource being studied.

The testing data set 1150 similarly stores multiple points 1155.1-$n$, where each point 1155.$k$ (where k is a number between 1 and n) includes key performance indicator (KPI) values 1160.$k$ and a network resource (NR) value 1165.$k$. The NR value 1165.$k$ corresponds to the network resource being studied. In some cases, the testing data set 1150 may have a same probability distribution of KPI values an NR values as the testing data set 1130.

When executing the network capacity or performance estimation module 1120, the processor 1105 receives (e.g., via input/output devices 1170) a selection of a target network resource for evaluation. The processor 1105 determines key performance indicators for computing a target network resource value for the target network resource. The determined key performance indicators are filtered out of a set of key performance indicators using statistical criteria and statistical approaches. The processor 1105 gathers (e.g., from the data repository 1190 accessible via the network 1195 and then network interface 1110) the training data set 1130. The processor 1105 trains the calculation module 1125 to calculate the selected target network resource value 1145.1-$m$ based on the KPI value(s) 1140.1-$m$ included in the training data set 1130. The processor 1105 tests the trained calculation module 1125 using the testing data set 1150. The processor 1105 provides, as output, an indication that the calculation module has been trained. The output may be provided via the input/output devices 1170. Examples of the operation of the network capacity or performance estimation module 1120 are discussed in greater detail below in conjunction with FIG. 12.

The calculation module 1125, when executed by the processor 1105, may be used to predict a target network resource value corresponding to input key performance indicator value(s). The calculation module 1125 may be trained to calculate the target network resource value using the key performance indicator value(s). The calculation module 1125 may store an equation for calculating the target network resource value using the key performance indicator value(s). The equation may be determined via operation of the network capacity or performance estimation module 1120, as described herein.

Figure 12:
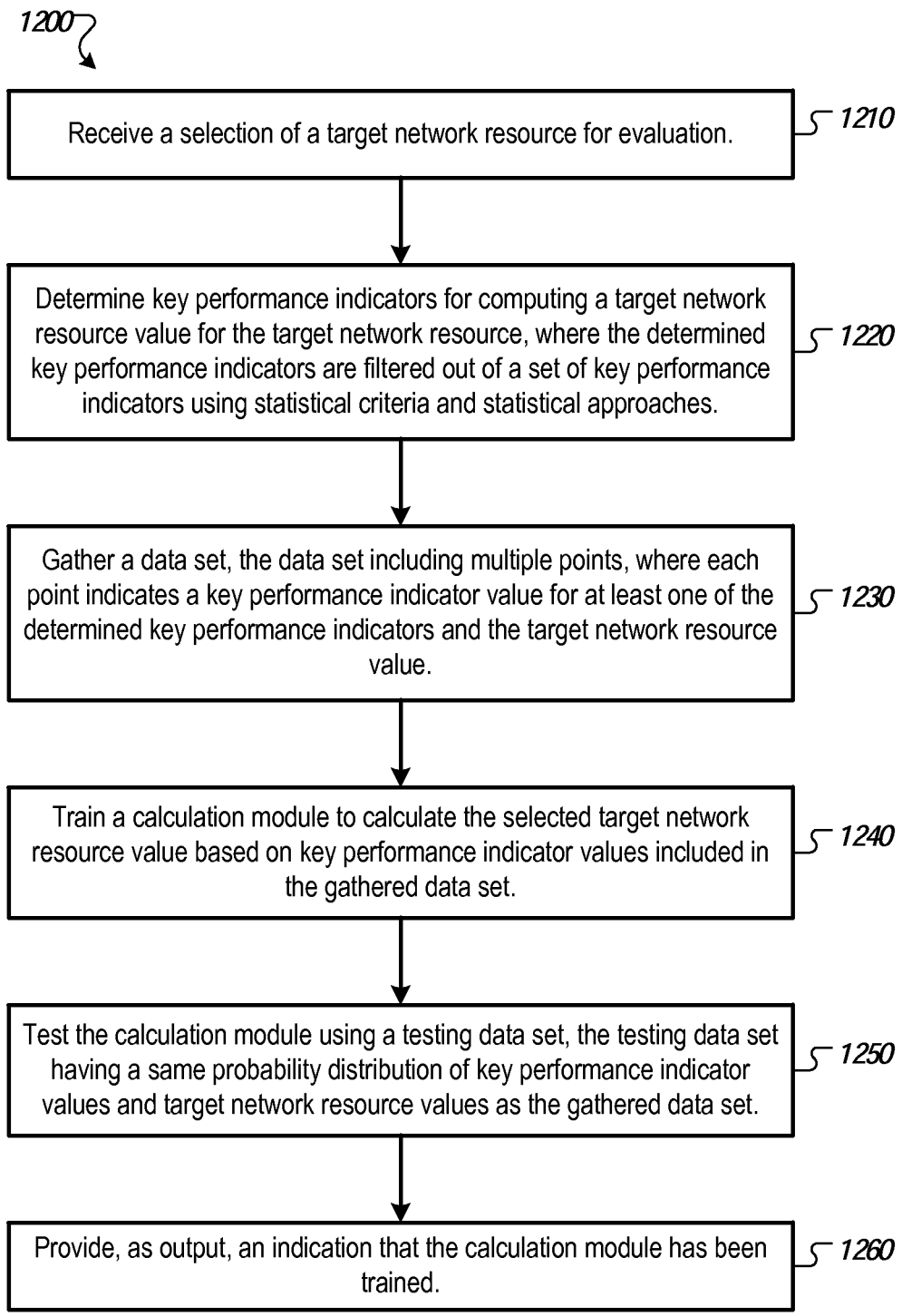
FIG. 12 illustrates an exemplary process for estimating network capacity or performance.

FIG. 12 illustrates an exemplary process 1200 for estimating network capacity or performance. The process 1200 begins at step 1210, where a computing device (e.g., computing device 1100 executing network capacity or performance estimation module 1120) receives a selection of a target network resource for evaluation. The target network resource may include an average number of connected users per cell, a downlink physical resource blocks (PRB) usage, an uplink physical resource blocks (PRB) usage, a physical downlink control channel (PDCCH) usage, a paging resource usage, an average number of active users in an uplink buffer per cell, an average number of active users in a downlink buffer per cell, or a physical random access channel (PRACH) usage. The target network resource may be selected using a touch screen or using a mouse operating in conjunction with a display unit (e.g., using input/output devices 1170). Alternatively, the selection of the target network resource may be received from a remote user via a network.

In step 1220, the computing device determines key performance indicators for computing a target network resource value for the target network resource. The determined key performance indicators are filtered out of a set of key performance indicators using statistical criteria and statistical approaches. The set of key performance indicators may include a voice call drop rate, a data call drop rate, a radio resource control (RRC) connection success rate, or a radio access bearer (RAB) setup success rate. The statistical criteria may include Akaike Information Criteria (AIC), Bayesian Information Criteria, Minimum Redundancy Maximum Relevance (MRMR), or Lasso. The statistical approaches may include improving model interpretability, shortening a model training time, enhancing generalization by reducing overfitting in the model, or maximizing mean accuracy rate and minimizing mean error rate.

In step 1230, the computing device gathers a data set (e.g., training data set 1130). The gathered data set includes multiple points (e.g., points 1135.1-$m$). Each point indicates a key performance indicator value for at least one of the determined key performance indicators and the target network resource value. The gathered data set may be gathered from historic data about the network being studied stored in a data repository (e.g., data repository 1190).

In step 1240, the computing device trains a calculation module (e.g., calculation module 1125) to calculate the selected target network resource value based on key performance indicators included in the gathered data set. The calculation module may be trained using any known artificial intelligence training techniques. In some examples, an incremental training technique may be used. In incremental training, equation(s) or value(s) stored by the calculation module are updated incrementally after each additional input is presented. For example, if the calculation module is attempting to calculate the selected target network resource using the equation NR=A*KPI1+B*KPI2, where NR represents the network resource, KPI1 and KPI2 are the KPIs, and A and B are values to be determined by the calculation module, the values of A and B may be adjusted incrementally after each additional input is presented.

In some cases, the computing device may determine, for each key performance indicator value, a trend component, the trend component representing an average key performance indicator value based on a time of day and a day of the week. The computing device may determine, for each key performance indicator value, a seasonality component, the seasonality component representing an average key performance indictor value based on a month and a day of the month. The computing device may determine, for each key performance indicator value, a burst component, the burst component representing a burst of unusual values of the key performance indicator value due to abnormal usage. The computing device may determine, for each key performance indicator value, a random error component, the random error component representing random error unaccounted for by the trend component, the seasonality component, and the burst component. The computing device may modify the calculation module to calculate the selected target network resource value based on time using the trend component, the seasonality component, the burst component, or the random error component. In some cases, the computing device may determine that the key performance indicator value is computed according to an equation: KPI=(1+B)*(T+S+R), where KPI represents the key performance indicator value, B represents the burst component, T represents the trend component, S represents the seasonality component, and R represents the random error component.

In some cases, for at least a first key performance indicator value of a first key performance indicator, the calculation module calculates the target network resource value according to an equation: NR=A*$e^{-B*KPI}$+C. In the above equation, NR represents the target network resource value, e represents 2.71828, and A, B, and C are constants. The constants A, B, or C may be determined based on other key performance indicator values for key performance indicators different from the first key performance indicator.

In step 1250, the computing device tests the calculation module using a testing data set (e.g., testing data set 1150). The testing data set may have a same probability distribution of key performance indicator values and target network resource values as the gathered data set. However, the testing data set may be different from the gathered data set.

In step 1260, the computing device provides, as output, an indication that the calculation module has been trained. For example, the computing device may display text indication that the calculation module has been trained on a display unit of the computing device. Alternatively, the computing device may transmit an electronic message (e.g., email or short messaging service) indicating that the calculation module has been trained. After step 1260, the process 1200 ends.

After the calculation module has been trained, the calculation module may be used to calculate the selected target network resource value. The calculation module may inform the user (e.g., via a display unit of a computer hosting the calculation module or via a message transmitted over a network, such as email or SMS) of the value of the selected target network resource as well as of average or desirable values of the selected target network resource. Average or desirable values of network resources may be stored in a network resource database.

If the value of the selected target network resource is greater than or equal to the average or desirable value, the user may be informed that no modification of the selected target network resource value is needed. If the value of the selected target network resource is less than the average or desirable value, the user may be notified that more of the selected target network resource is needed, and the user (who may be a network manager for a mobile operator) may be notified of components or infrastructure that may be purchased, built or installed to increase the selected target network resource. The user may also be notified of amounts of components or infrastructure to purchase, build or install in order to bring the target network resource to the average or desirable value. Based on this information, the user may purchase, build or install (or cause others to purchase, build or install) the required components or infrastructure.

As a result of some implementations of the subject technology, a mobile operator's money that is invested in the network infrastructure may be spent more optimally. For example, the money may be spent to purchase, build or install components that increase the values of bottleneck network resources that are below average or desirable valued. In this way, faster or more efficient networks that cost less money may be built.

Figure 13:
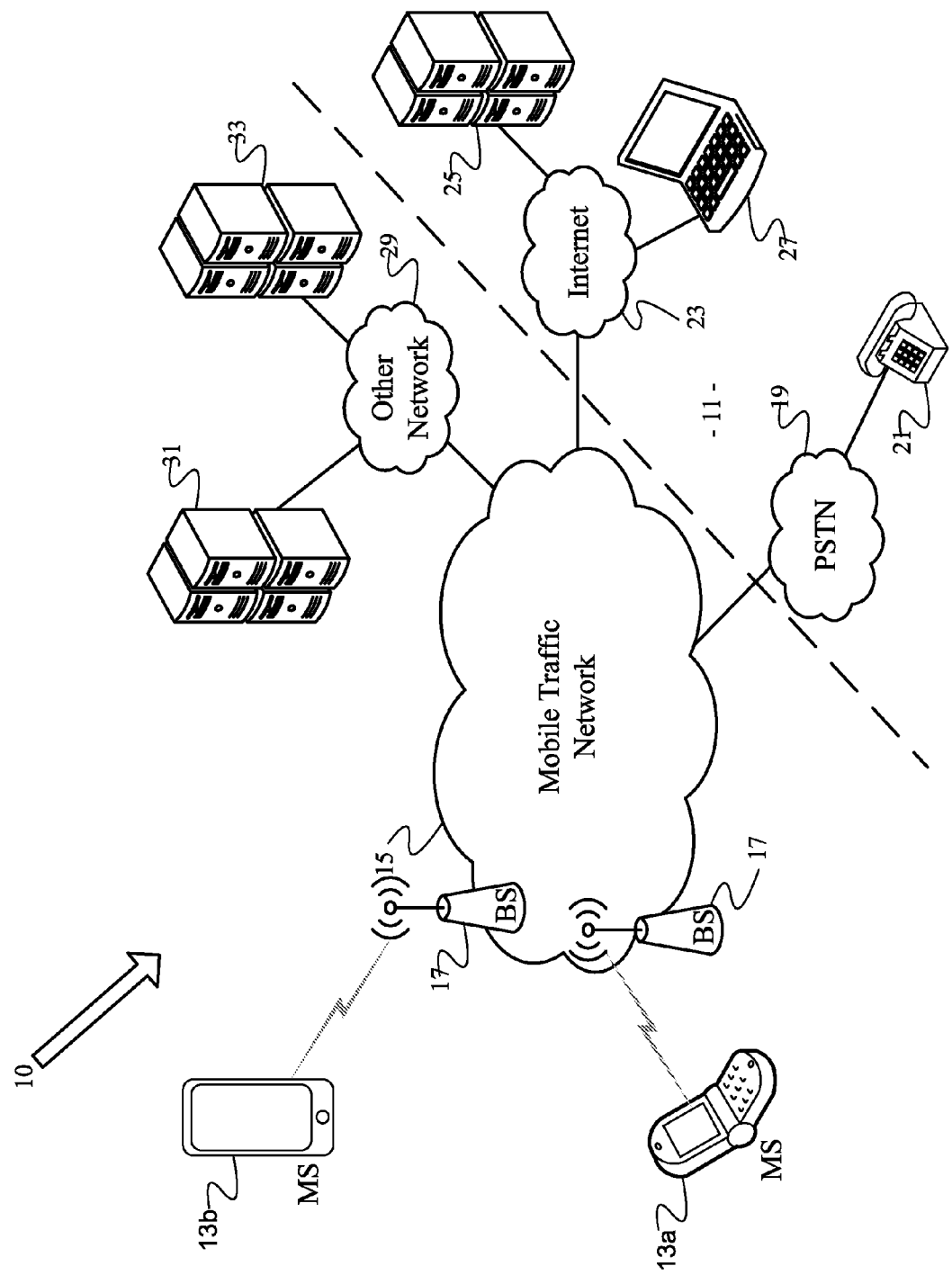
FIG. 13 is a high-level functional block diagram of an example of a system of networks/devices that provide various communications for mobile stations, for which network capacity or performance may be estimated.

FIG. 13 illustrates a system 10 offering a variety of mobile communication services. The example shows simply two mobile stations (MSs) 13$a$ and 13$b$ as well as a mobile communication network 15. The stations 13$a$ and 13$b$ are examples of mobile stations. The network 15 provides mobile wireless communications services to those stations as well as to other mobile stations (not shown), for example, via a number of base stations (BSs) 17. The network 15 may correspond to the network that is being studied by the network capacity or performance estimation module 1120 of FIG. 11. The present techniques may be implemented in or used to study any of a variety of available mobile networks 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may are capable of voice telephone communications through the network 15, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell."

The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

The subject technology may be implemented in conjunction with touch screen type mobile stations as well as to non-touch type mobile stations. Hence, our simple example shows the mobile station (MS) 13*a* as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations.

As shown by the above discussion, functions relating to estimating network capacity or performance may be implemented on computers connected for data communication via the components of a packet data network, as shown in FIG. 13. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, via a computing device, a selection of a target network resource for evaluation;

determining, via the computing device, key performance indicators for computing a target network resource value for the target network resource, wherein the determined key performance indicators are filtered out of a set of key performance indicators using statistical criteria and statistical approaches;

gathering a data set, the data set comprising a plurality of points, wherein each point indicates a key performance indicator value for at least one of the determined key performance indicators and the target network resource value;

training, via incremental training, a calculation module to calculate the selected target network resource value based on key performance indicator values included in the gathered data set, wherein the incremental training comprises updating the calculation module after each additional key performance indicator value set is presented to the calculation module;

testing the calculation module using a testing data set, the testing data set having a same probability distribution of key performance indicator values and target network resource values as the gathered data set; and providing, as output, an indication that the calculation module has been trained.

2. The method of claim 1, further comprising:

calculating, using the trained calculation module, a current value of the selected target network resource;

determining that the current value of the selected target network resource is not optimal; and providing, as output, an indication of network infrastructure or network components to be added to the network for making optimal the current value of the selected target network resource.

3. The method of claim 1, further comprising:
determining, for each key performance indicator value, at least one of:
- a trend component, the trend component representing a long-term trend of the key performance indicator value, wherein the long-term trend is a monthly trend or a yearly trend;
- a seasonality component, the seasonality component corresponding to a periodicity of the key performance indicator value, wherein the periodicity of the key performance indicator value has a period of seven days;
- a burst component, the burst component representing a predictable outlier of the key performance indicator from a combination of the trend component and the seasonality component; or
- a random error component, the random error component representing random error unaccounted for by the trend component, the seasonality component, and the burst component; and modifying the calculation module to calculate the selected target network resource value based on time using the trend component, the seasonality component, the burst component, or the random error component.

4. The method of claim 3, further comprising:
determining that the key performance indicator value is computed according to an equation: KPI=(1+B)*(T+S+R), wherein:
KPI represents the key performance indicator value,
B represents the burst component,
T represents the trend component,
S represents the seasonality component, and
R represents the random error component.

5. The method of claim 1, wherein, for at least a first key performance indicator value of a first key performance indicator, the calculation module calculates the target network resource value according to an equation: $NR=A*e^{-B*KPI}+C$, wherein:
NR represents the target network resource value,
e represents 2.71828, and
A, B, and C are constants.

6. The method of claim 5, wherein A, B, or C are determined based on other key performance indicator values for key performance indicators different from the first key performance indicator.

7. The method of claim 1, further comprising predicting, using the trained calculation module, a new target network resource value corresponding to new key performance indicator values.

8. The method of claim 1, wherein the target network resource comprises one or more of an average number of connected users per cell, a downlink physical resource blocks (PRB) usage, an uplink physical resource blocks (PRB) usage, a physical downlink control channel (PDCCH) usage, a paging resource usage, an average number of active users in an uplink buffer per cell, an average number of active users in a downlink buffer per cell, or a physical random access channel (PRACH) usage.

9. The method of claim 1, wherein the set of key performance indicators comprises one or more of a voice call drop rate, a data call drop rate, a radio resource control (RRC) connection success rate, or a radio access bearer (RAB) setup success rate.

10. The method of claim 1, wherein the statistical criteria comprises one or more of Akaike Information Criteria (AIC), Bayesian Information Criteria, Minimum Redundancy Maximum Relevance (MRMR), or Lasso.

11. The method of claim 1, wherein the statistical approaches comprises one or more of improving model interpretability, shortening a model training time, enhancing generalization by reducing over-fitting in the model, or maximizing mean accuracy rate and minimizing mean error rate.

12. A non-transitory computer-readable medium comprising instructions which, when executed by a computer, cause the computer to:
receive a selection of a target network resource for evaluation;
determine key performance indicators for computing a target network resource value for the target network resource, wherein the determined key performance indicators are filtered out of a set of key performance indicators using statistical criteria and statistical approaches;
gather a data set, the data set comprising a plurality of points, wherein each point indicates a key performance indicator value for at least one of the determined key performance indicators and the target network resource value;
train, via incremental training, a calculation module to calculate the selected target network resource value based on key performance indicator values included in the gathered data set, wherein the incremental training comprises updating the calculation module after each additional key performance indicator value set is presented to the calculation module;
test the calculation module using a testing data set, the testing data set having a same probability distribution of key performance indicator values and target network resource values as the gathered data set; and
provide, as output, an indication that the calculation module has been trained.

13. The computer-readable medium of claim 12, further comprising instructions which, when executed by the computer, cause the computer to:
determine, for each key performance indicator value, at least one of:
- a trend component, the trend component representing a long-term trend of the key performance indicator value, wherein the long-term trend is a monthly trend or a yearly trend;
- a seasonality component, the seasonality component corresponding to a periodicity of the key performance indicator value, wherein the periodicity of the key performance indicator value has a period of seven days;
- a burst component, the burst component representing a predictable outlier of the key performance indicator from a combination of the trend component and the seasonality component; or
- a random error component, the random error component representing random error unaccounted for by the trend component, the seasonality component, and the burst component; and modify the calculation module to calculate the selected target network resource value based on time using the trend component, the seasonality component, the burst component, or the random error component.

14. The computer-readable medium of claim 13, further comprising instructions which, when executed by the computer, cause the computer to:
  determine that the key performance indicator value is computed according to an equation: KPI=(1+B)*(T+S+R), wherein:
  KPI represents the key performance indicator value,
  B represents the burst component,
  T represents the trend component,
  S represents the seasonality component, and
  R represents the random error component.

15. The computer-readable medium of claim 12, wherein, for at least a first key performance indicator value of a first key performance indicator, the calculation module calculates the target network resource value according to an equation: $NR=A*e^{-B*KPI}+C$, wherein:
  NR represents the target network resource value,
  e represents 2.71828, and
  A, B, and C are constants.

16. The computer-readable medium of claim 15, wherein A, B, or C are determined based on other key performance indicator values for key performance indicators different from the first key performance indicator.

17. The computer-readable medium of claim 12, further comprising instructions which, when executed by the computer, cause the computer to predict, using the trained calculation module, a new target network resource value corresponding to new key performance indicator values.

18. The computer-readable medium of claim 12, wherein the target network resource comprises one or more of an average number of connected users per cell, a downlink physical resource blocks (PRB) usage, an uplink physical resource blocks (PRB) usage, a physical downlink control channel (PDCCH) usage, a paging resource usage, an average number of active users in an uplink buffer per cell, an average number of active users in a downlink buffer per cell, or a physical random access channel (PRACH) usage.

19. The computer-readable medium of claim 12, wherein the set of key performance indicators comprises one or more of a voice call drop rate, a data call drop rate, a radio resource control (RRC) connection success rate, or a radio access bearer (RAB) setup success rate.

20. A system comprising:
  one or more processors; and
  a memory storing instructions which, when executed by the one or more processors, cause the one or more processors to:
    receive a selection of a target network resource for evaluation;
    determine key performance indicators for computing a target network resource value for the target network resource, wherein the determined key performance indicators are filtered out of a set of key performance indicators using statistical criteria and statistical approaches;
    gather a data set, the data set comprising a plurality of points, wherein each point indicates a key performance indicator value for at least one of the determined key performance indicators and the target network resource value;
    train, via incremental training, a calculation module to calculate the selected target network resource value based on key performance indicator values included in the gathered data set, wherein the incremental training comprises updating the calculation module after each additional key performance indicator value set is presented to the calculation module;
    test the calculation module using a testing data set, the testing data set having a same probability distribution of key performance indicator values and target network resource values as the gathered data set; and
    provide, as output, an indication that the calculation module has been trained.

* * * * *